United States Patent
Miyazaki et al.

(10) Patent No.: US 8,941,621 B2
(45) Date of Patent: Jan. 27, 2015

(54) AREA SENSOR, AND LIQUID-CRYSTAL DISPLAY DEVICE EQUIPPED WITH AN AREA SENSOR

(75) Inventors: Shinichi Miyazaki, Osaka (JP); Kengo Takahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 485 days.

(21) Appl. No.: 13/502,529

(22) PCT Filed: Jun. 1, 2010

(86) PCT No.: PCT/JP2010/059279

§ 371 (c)(1),
(2), (4) Date: Apr. 18, 2012

(87) PCT Pub. No.: WO2011/048841

PCT Pub. Date: Apr. 28, 2011

(65) Prior Publication Data

US 2012/0206415 A1 Aug. 16, 2012

(30) Foreign Application Priority Data

Oct. 23, 2009 (JP) ................................ 2009-244477

(51) Int. Cl.
G06F 3/042 (2006.01)
G02F 1/1335 (2006.01)
G06F 3/041 (2006.01)
G09F 9/00 (2006.01)
G02F 1/1333 (2006.01)

(52) U.S. Cl.
CPC .............. *G02F 1/1335* (2013.01); *G06F 3/041* (2013.01); *G09F 9/00* (2013.01); *G02F 1/13338* (2013.01); *G02F 2201/58* (2013.01)
USPC ......................................... 345/175; 345/179

(58) Field of Classification Search
USPC ........................................................ 345/175
See application file for complete search history.

(56) References Cited

U.S. PATENT DOCUMENTS

2003/0156100 A1* 8/2003 Gettemy ....................... 345/204
2006/0023093 A1* 2/2006 Tan et al. ...................... 348/263
(Continued)

FOREIGN PATENT DOCUMENTS

JP 2002-366293 A 12/2002
(Continued)

OTHER PUBLICATIONS

Official Communication issued in International Patent Application No. PCT/JP2010/059279, mailed on Aug. 17, 2010.

*Primary Examiner* — Kathy Wang-Hurst
*Assistant Examiner* — Joseph Fox
(74) *Attorney, Agent, or Firm* — Keating & Bennett, LLP

(57) ABSTRACT

In order to simultaneously carry out, at a smaller sensor density, (i) detection of color information (recognition of a color) of visible light which enters a detection target surface and (ii) detection of an input position of the visible light, a liquid-crystal panel (20) included in a liquid-crystal display device of the present invention has an area sensor function of detecting color information and an input position of visible light by sensing an input image of the visible light on a panel surface. The liquid-crystal panel (20) (position detecting section) includes (i) a yellow sensor (31Y) including a light sensor element (30) which senses an intensity of green light and red light from among three primary color lights and (ii) a cyan sensor (31C) including a light sensor element (30) which senses an intensity of blue light and green light from among the three primary color lights. Sensing of the input image of the visible light on the panel surface by each of the yellow sensor (31Y) and the cyan sensor (31C) allows detection of the color information and the input position.

9 Claims, 16 Drawing Sheets

(56) References Cited

U.S. PATENT DOCUMENTS

2009/0161051 A1* 6/2009 Fukunaga et al. ............ 349/115
2011/0128467 A1* 6/2011 Miyazaki et al. ............... 349/61
2011/0279414 A1* 11/2011 Noma et al. ................... 345/175
2011/0298757 A1* 12/2011 Hata et al. ..................... 345/175

FOREIGN PATENT DOCUMENTS

| JP | 2005-215214 A | 8/2005 |
| JP | 2005-278038 A | 10/2005 |
| JP | 2006-323332 A | 11/2006 |
| JP | 2009-020521 A | 1/2009 |

* cited by examiner

F I G. 9
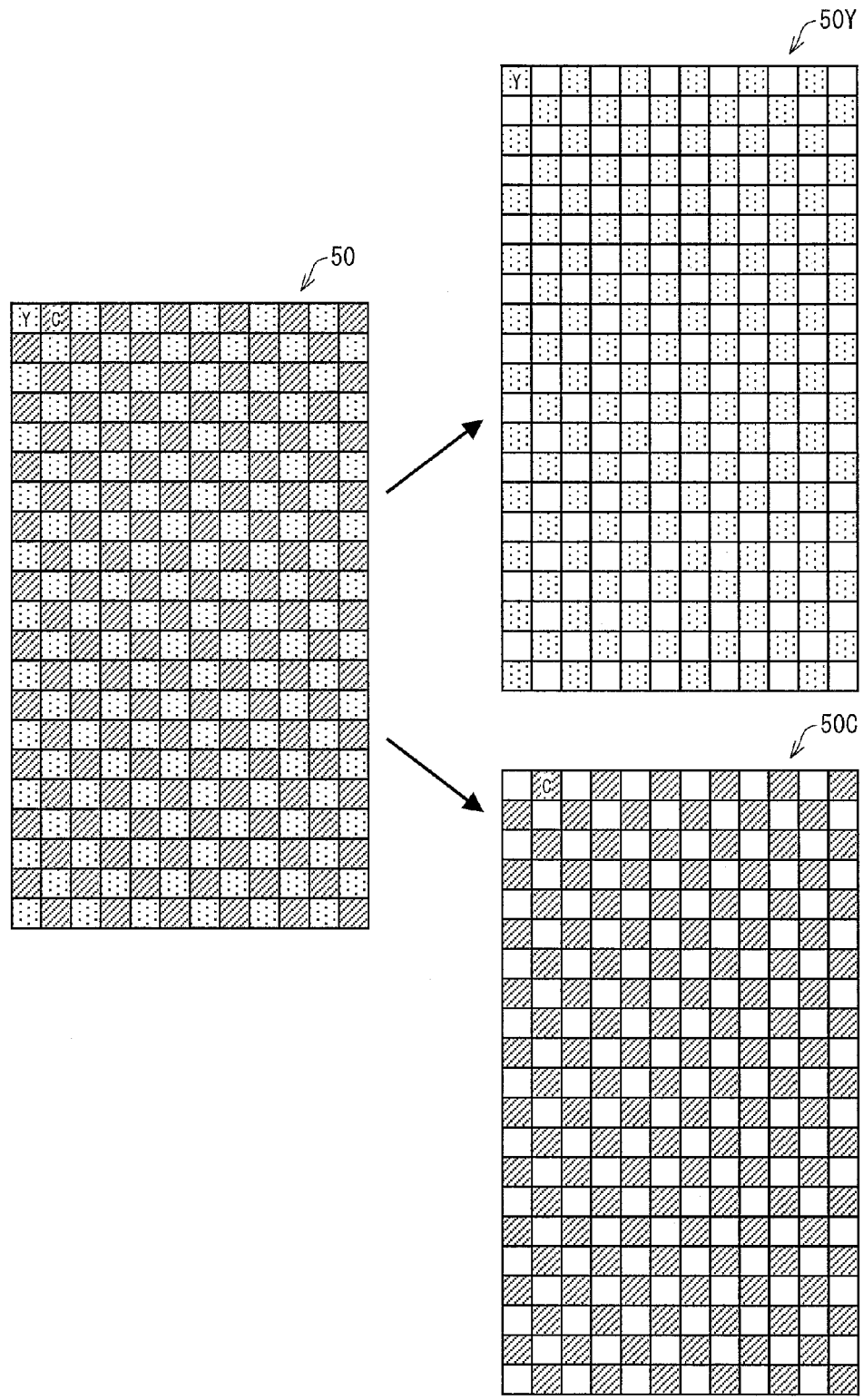

F I G. 1 3
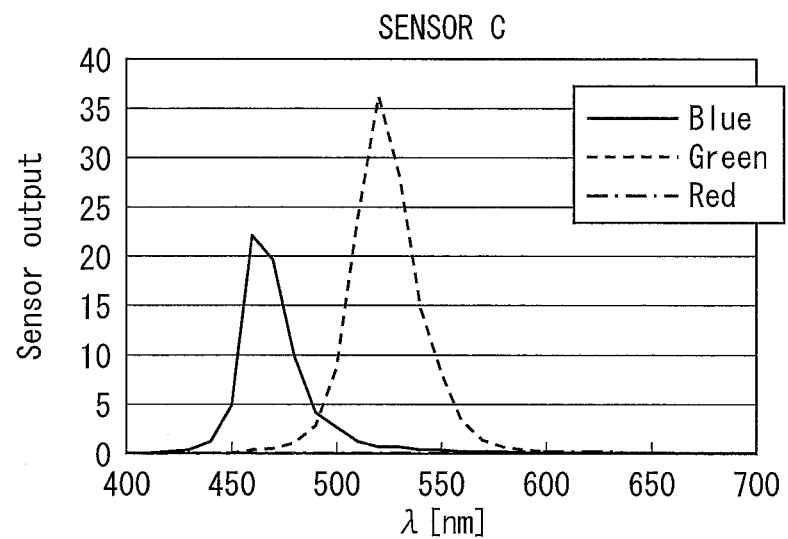
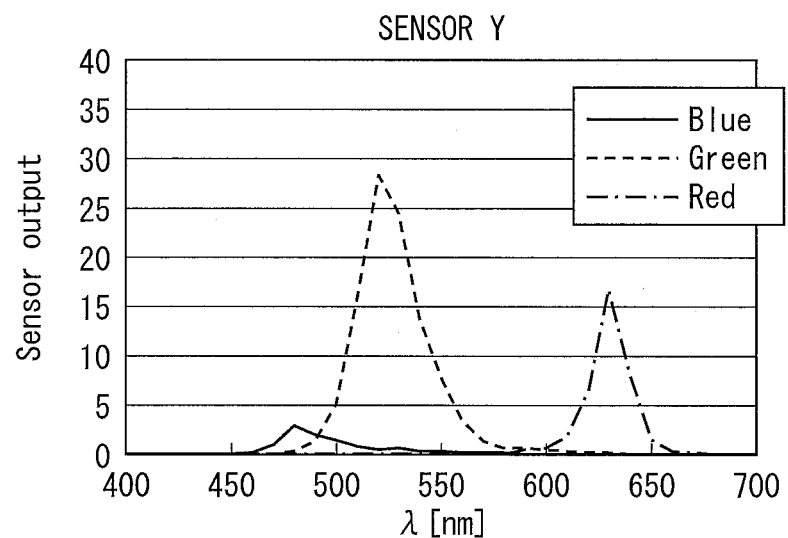

F I G. 2 1
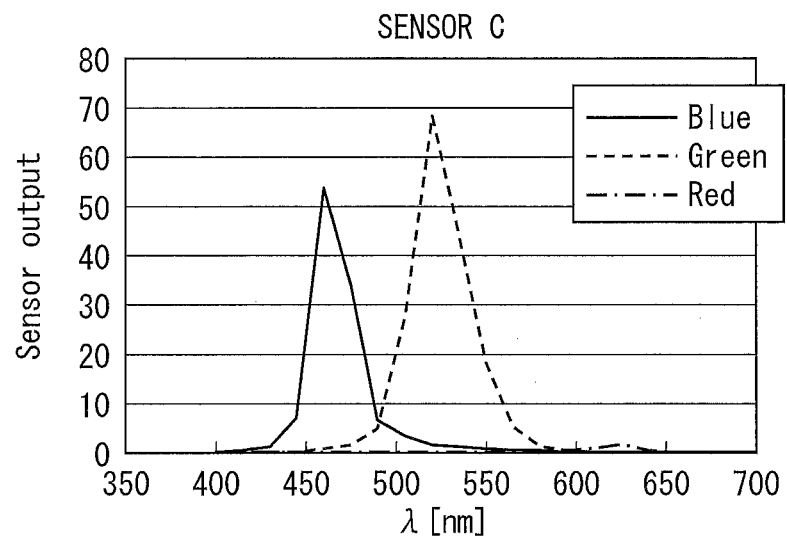
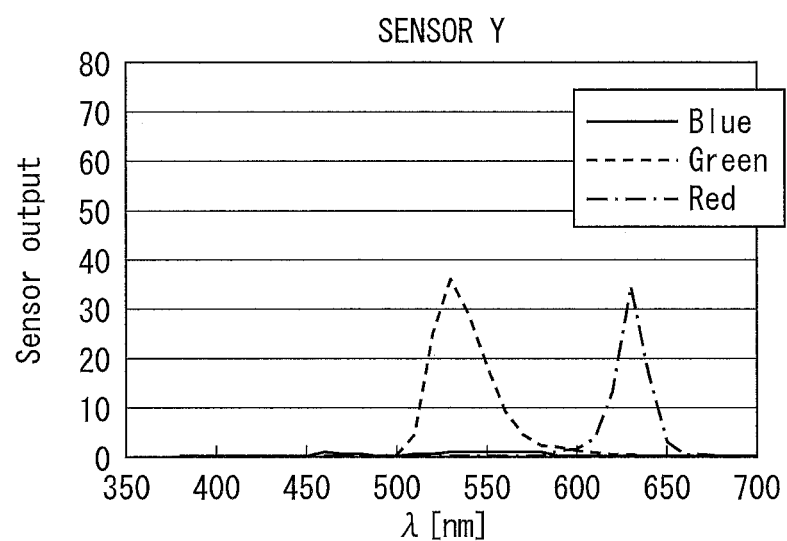

AREA SENSOR, AND LIQUID-CRYSTAL DISPLAY DEVICE EQUIPPED WITH AN AREA SENSOR

TECHNICAL FIELD

The present invention relates to an area sensor which includes a light sensor element and detects an input position from an outside, and to a liquid-crystal display device which includes such an area sensor.

BACKGROUND ART

Examples of a display device such as a liquid-crystal display device which is being developed include a touch panel integrated display device that has a touch panel (an area sensor) function of detecting (i) a position in a panel surface which position is touched with an input pen emitting visible light and (ii) color information of the visible light.

For example, Patent Literature 1 discloses an image pickup apparatus which uses, as a light sensor element, an image sensor having a CMOS structure, so as to discriminate a light source, an object, etc., which emits light of different wavelengths. According to the image pickup apparatus disclosed in Patent Literature 1, a pixel of a color filter which has a specific light transmittivity is selectively read while a pixel signal is being read from a pixel array section in which color filters are provided for respective pixels in a given pattern, and a signal intensity of the read pixel is determined, so that a color of the light which is emitted from the light source, the object, etc. is determined.

CITATION LIST

Patent Literature

Patent Literature 1
Japanese Patent Application Publication, Tokukai, No. 2005-278038 A (Publication Date: Oct. 6, 2005)

SUMMARY OF INVENTION

Technical Problem

However, a highly elaborate process is required for production of a light sensor element having a CMOS structure. Therefore, it is unsuitable to provide, in a liquid-crystal panel of a liquid-crystal display device, the image sensor described in Patent Literature 1 for use as a display device having a touch panel function.

In view of the circumstances, in order to detect color information (recognize a color), a touch panel integrated display device which has a touch panel (an area sensor) function of detecting a position and color information of an input pen proposes the following arrangements.

(1) The arrangement in which three area sensors that sense red light, blue light, and green light, respectively are merely provided for each pixel region of a liquid-crystal panel.

(2) The arrangement that has a system in which visible light received by an area sensor is decomposed into red light, blue light, and green light, a sensing process is individually carried out with respect to the red light, the blue light, and the green light, and thereafter data obtained by the sensing process is composed.

From the viewpoint of a balance with a display performance (an aperture ratio) of a liquid-crystal panel, a touch panel integrated display device is limited in provision of an area sensor. Further, a light sensor element made of amorphous silicon is used for the area sensor of the touch panel integrated display device. Therefore, the touch panel integrated display device is limited in miniaturization depending on a performance of the light sensor element.

In view of such limitations in designing of the touch panel integrated display device, the arrangement (1) has a problem such that it is difficult to form, in the liquid-crystal panel, the area sensors, which increase in density. Meanwhile, the arrangement (2) has a problem such that the system cannot be contained in a liquid-crystal panel.

A design rule for a liquid-crystal panel process is several µm, and is larger than a design rule (50 nm to 100 nm) for a semiconductor element (e.g., an IC) process.

In view of such constraints on the design rule in the touch panel integrated display device, according to the arrangement (1), a liquid-crystal device occupies a larger area in a case where a light-receiving element of the area sensor is formed by use of amorphous silicon or polysilicon in a single process in which the liquid-crystal panel is formed. In addition, the light-receiving element tends to be larger in size due to a difference in crystalline performance.

Therefore, in a case where the image sensor described in Patent Literature 1 is provided in a liquid-crystal panel of a liquid-crystal display device, it is necessary to dramatically reduce a transmittivity of the liquid-crystal panel or to reduce a resolution of the area sensor.

Solution to Problem

The present invention has been made in view of the problems, and an object of the present invention is to make (I) an area sensor which is capable of simultaneously carrying out, at a smaller sensor density, (i) detection of color information (recognition of a color) of visible light that enters a detection target surface and (ii) detection of an input position of the visible light, and (II) a liquid-crystal display device which includes the area sensor.

In order to attain the object, an area sensor of the present invention which detects color information and an input position of visible light by sensing an input image of the visible light on a detection target surface, the area sensor includes: at least one first sensor which includes a first light sensor element that senses an intensity of light of a first combination of two primary colors from among red, blue, and green; at least one second sensor which includes a second light sensor element that senses an intensity of light of a second combination of two primary colors from among red, blue, and green, the two primary colors being different from the two primary colors constituting the first combination; and a position detecting section which detects color information and an input position of visible light by causing the at least one first sensor and the at least one second sensor to sense respective input images of the visible light on a detection target surface.

Note here that the color information is information about a color of light which enters the area sensor through the detection target surface. That is, the color information is information about in what wavelength range the light which enters the area sensor through the detection target surface is included.

The area sensor of the present invention includes two types of sensors which are different from each other in wavelength range of visible light to sense. The two types of sensors are (i) at least one first sensor which includes a first light sensor element that senses an intensity of light of a first combination of two primary colors from among red, blue, and green and (ii) at least one second sensor which includes a second light sensor element that senses an intensity of light of a second combination of two primary colors from among red, blue, and green, the two primary colors being different from the two primary colors constituting the first combination.

That is, the at least one first sensor can sense an intensity of light which corresponds to a spectral transmission characteristic of the two primary colors constituting the first combination, whereas the at least one second sensor can sense an intensity of light which corresponds to a spectral transmission characteristic of the two primary colors constituting the second combination. As described above, the at least one first sensor and the at least one second sensor can sense respective intensities of colors which are different from each other (i.e., light in wavelength ranges which are different from each other).

According to the arrangement, the at least one first sensor and the at least one second sensor which are different from each other in wavelength range of visible light to sense can sense respective input images of visible light on a detection target surface as described above. Color information and an input position of the visible light are detected by use of the input images of the visible light which are obtained from the at least one first sensor and the at least one second sensor, respectively.

As described earlier, according to the arrangement, color information and an input position of visible light which has entered a detection target surface can be detected simultaneously by use of two types of sensors of the at least one first sensor and the at least one second sensor which are different from each other in wavelength region of visible light to sense. Therefore, the arrangement allows obtainment of a smaller sensor density as compared to an area sensor (the arrangement (1) described earlier) in which three sensors that sense light of respective three primary colors are merely provided for each pixel.

In order to attain the object, a liquid-crystal display device of the present invention includes: a liquid-crystal panel including a liquid-crystal layer which is provided between an active matrix substrate and a counter substrate, the liquid-crystal panel having an area sensor function of detecting color information and an input position of visible light by sensing an input image of the visible light on a detection target surface, the liquid-crystal display device further including: at least one first sensor which includes a first light sensor element that senses an intensity of light of a first combination of two primary colors from among red, blue, and green; at least one second sensor which includes a second light sensor element that senses an intensity of light of a second combination of two primary colors from among red, blue, and green, the two primary colors being different from the two primary colors constituting the first combination; and a position detecting section which detects color information and an input position of visible light by causing the at least one first sensor and the at least one second sensor to sense respective input images of the visible light on a panel surface.

The position detecting section of the liquid-crystal device of the present invention includes two types of sensors which are different from each other in wavelength range of visible light to sense. The two types of sensors are (i) at least one first sensor which includes a first light sensor element that senses an intensity of light of a first combination of two primary colors from among red, blue, and green and (ii) at least one second sensor which includes a second light sensor element that senses an intensity of light of a second combination of two primary colors from among red, blue, and green, the two primary colors being different from the two primary colors constituting the first combination.

According to the arrangement, the at least one first sensor and the at least one second sensor which are different from each other in wavelength range of visible light to sense can sense respective input images of visible light on a detection target surface as described above. Color information and an input position of the visible light are detected by use of the input images of the visible light which are obtained from the at least one first sensor and the at least one second sensor, respectively.

As described earlier, according to the arrangement, color information and an input position of visible light which has entered a detection target surface can be detected simultaneously by use of two types of sensors of the at least one first sensor and the at least one second sensor which are different from each other in wavelength region of visible light to sense. Therefore, the arrangement allows obtainment of a smaller sensor density as compared to an area sensor (the arrangement (1) described earlier) in which three sensors that sense light of respective three primary colors are merely provided for each pixel.

Advantageous Effects of Invention

According to the area sensor of the present invention, color information and an input position of visible light which has entered a detection target surface can be detected simultaneously by use of two types of sensors of the at least one first sensor and the at least one second sensor which are different from each other in wavelength region of visible light to sense. Therefore, the arrangement allows obtainment of a smaller sensor density as compared to an area sensor (the arrangement (1) described earlier) in which three sensors that sense light of respective three primary colors are merely provided for each pixel.

According to the liquid-crystal display device of the present invention, color information and an input position of visible light which has entered a detection target surface can be detected simultaneously by use of two types of sensors of the at least one first sensor and the at least one second sensor which are different from each other in wavelength region of visible light to sense. Therefore, the arrangement allows obtainment of a smaller sensor density as compared to an area sensor (the arrangement (1) described earlier) in which three sensors that sense light of respective three primary colors are merely provided for each pixel.

For a fuller understanding of the nature and advantages of the invention, reference should be made to the ensuing detailed description taken in conjunction with the accompanying drawings.

Figure 3:
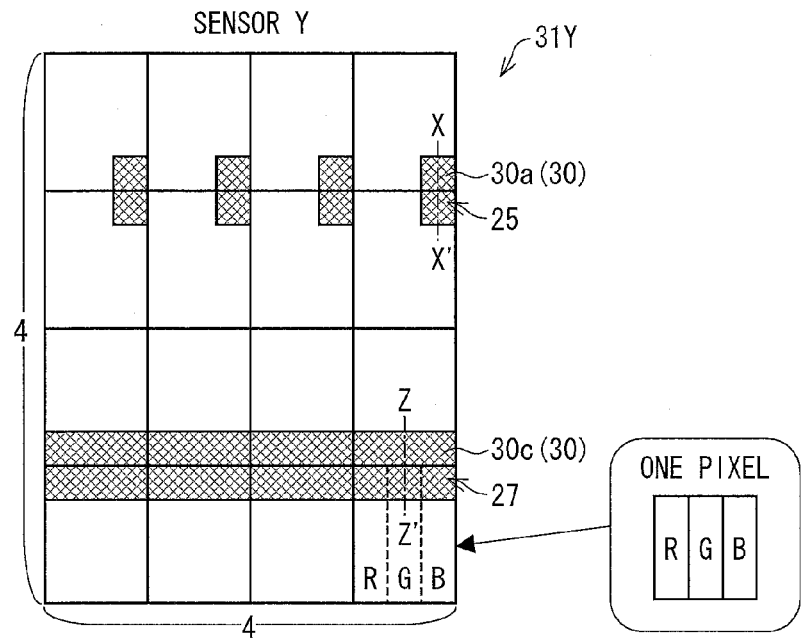
FIG. 3 is a schematic view illustrating a more specific arrangement of a yellow sensor.
Figure 4:
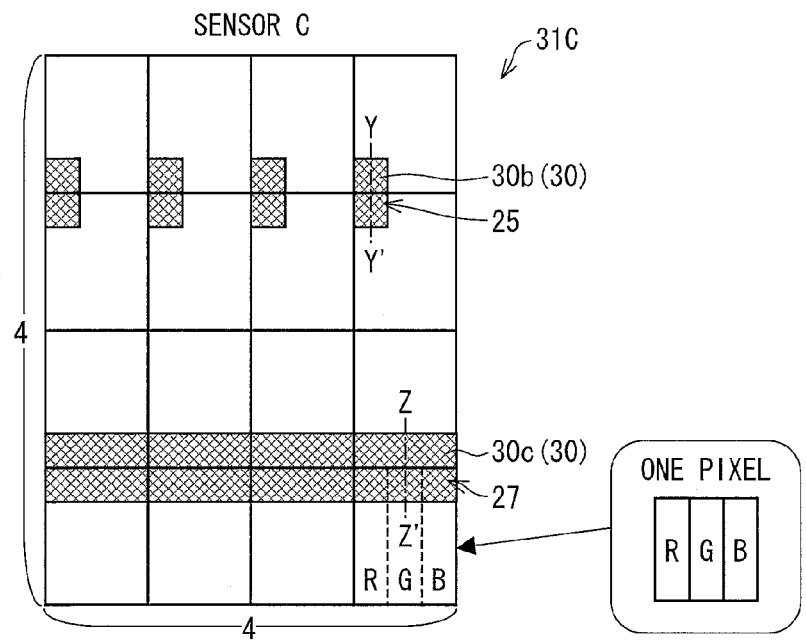
FIG. 4 is a schematic view illustrating a more specific arrangement of a cyan sensor.
Figure 5:
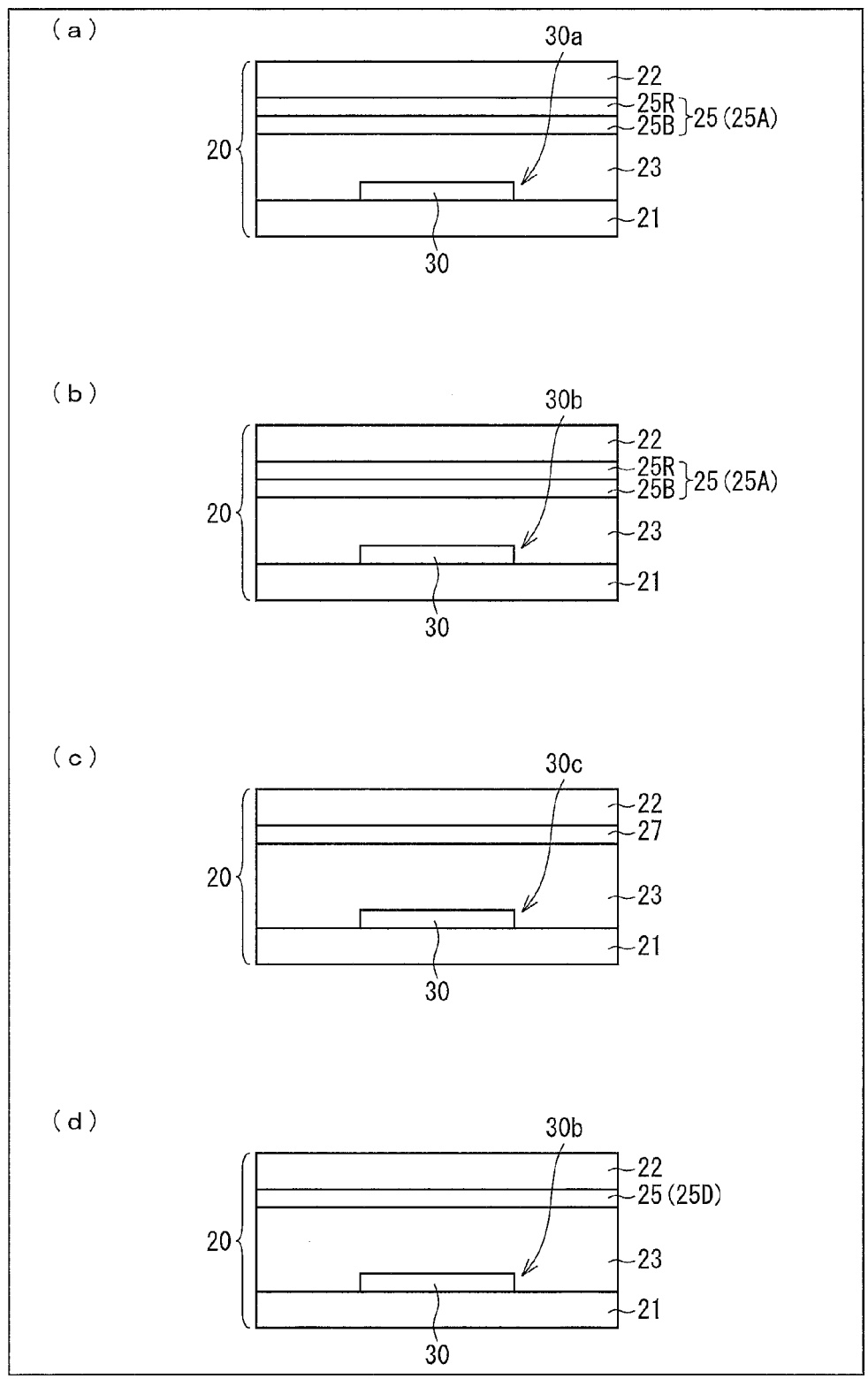

(a) of FIG. 5 is a cross-sectional view illustrating an arrangement of a cross section in line X-X' in the yellow sensor illustrated in FIG. 3. (b) of FIG. 5 is a cross-sectional view illustrating an arrangement of a cross section in line Y-Y' in the cyan sensor illustrated in FIG. 4. (c) of FIG. 5 is a cross-sectional view illustrating an arrangement of a cross section in line Z-Z' in each of the yellow sensor and the cyan sensor. (d) of FIG. 5, which shows a cyan sensor that is different in structure from the cyan sensor illustrated in (b) of FIG. 5, is a cross-sectional view illustrating an arrangement of a cross section in line Y-Y' in the cyan sensor illustrated in FIG. 4.

Figure 1:
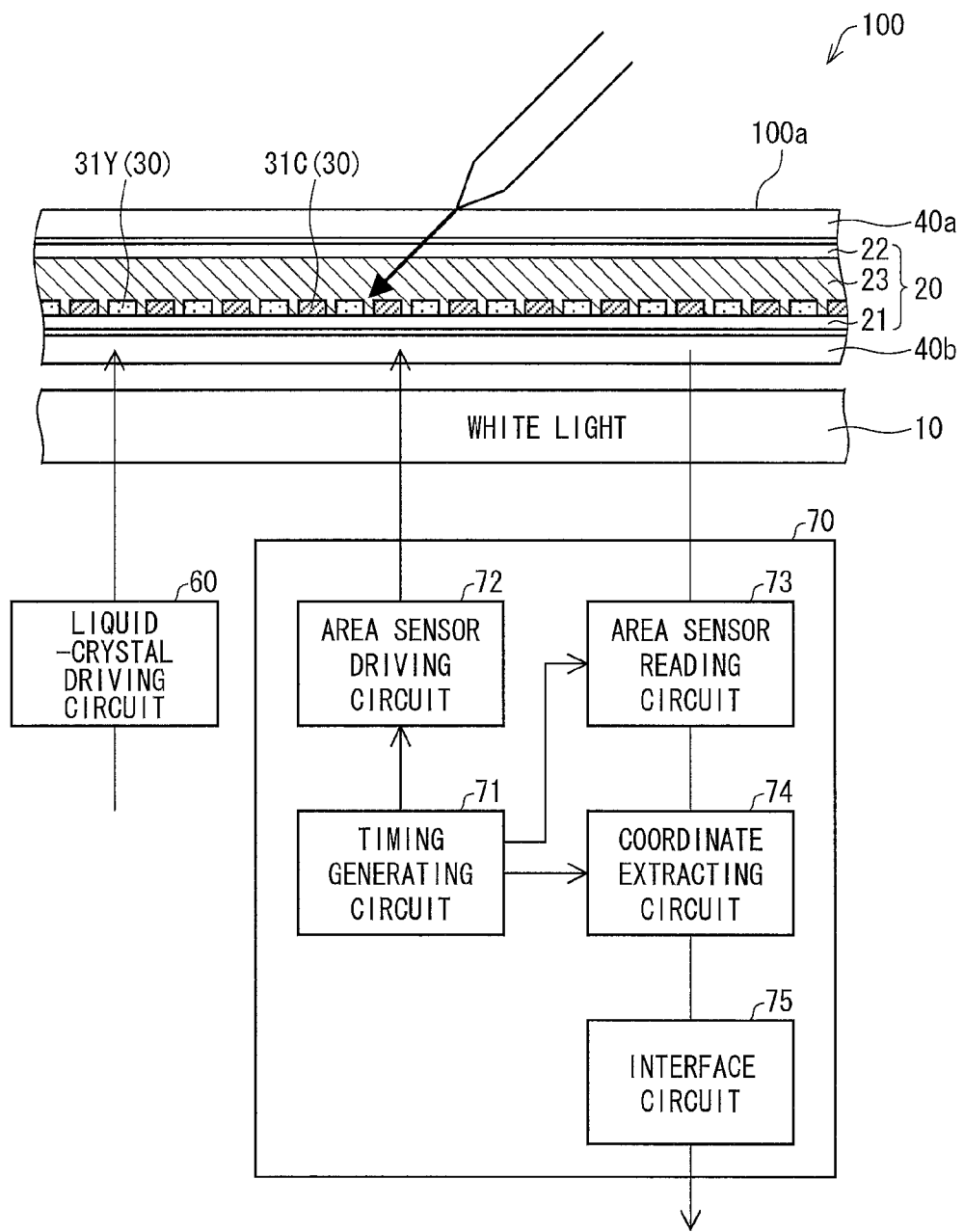
FIG. 1 is a schematic view illustrating an arrangement of a liquid-crystal display device in accordance with a first embodiment of the present invention.
Figure 6:
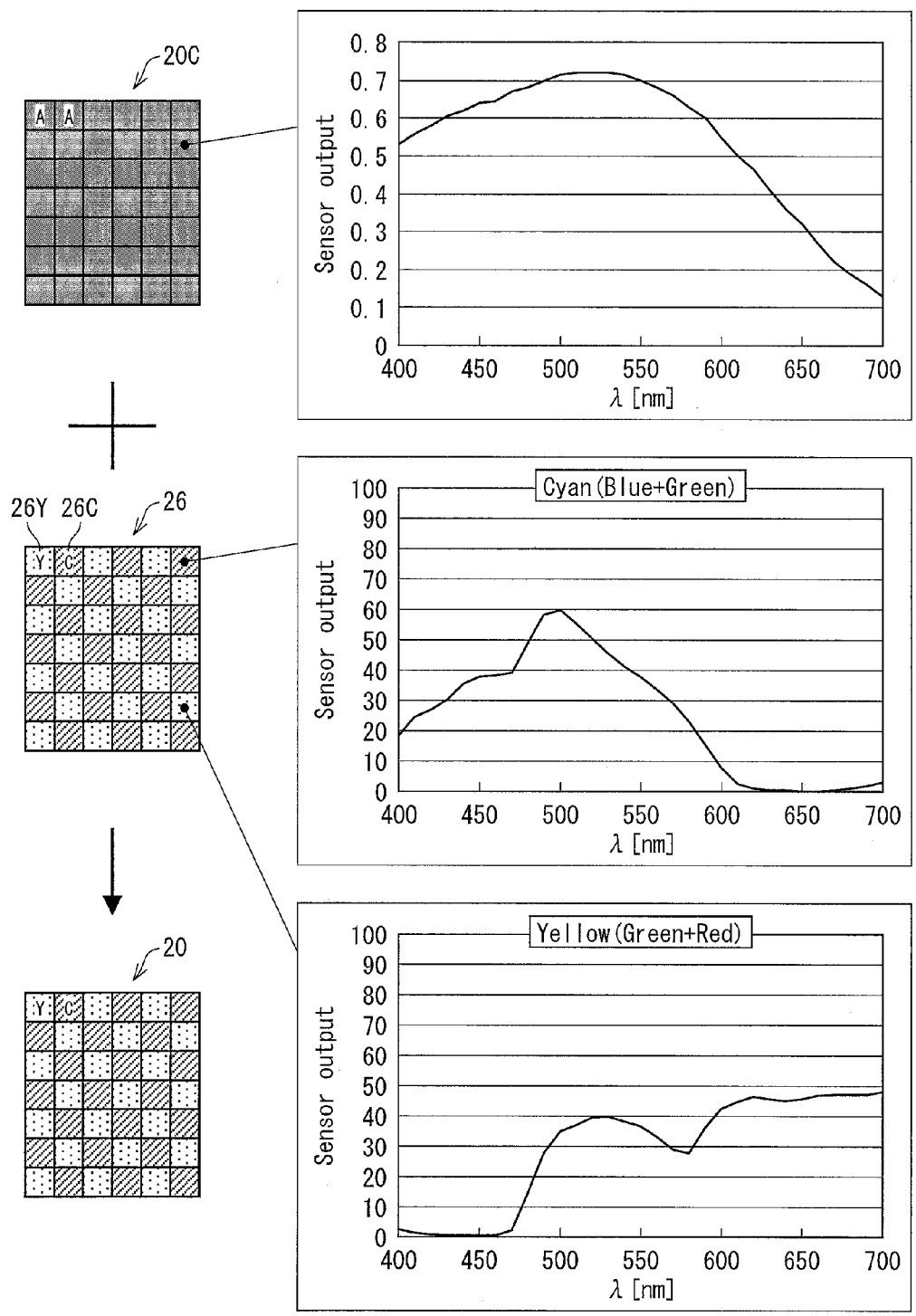

FIG. 6 is a schematic view for explaining the liquid-crystal panel illustrated in FIG. 1.

Figure 7:
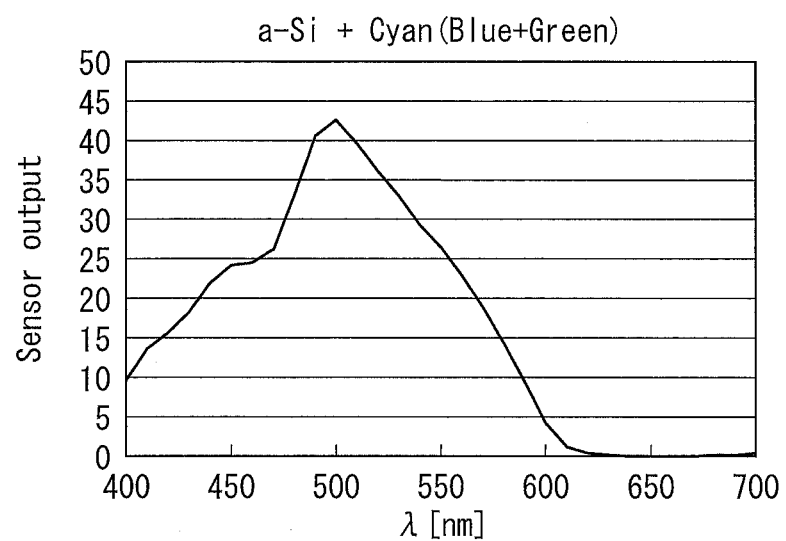

FIG. 7 is a graph showing a spectral sensitivity of a cyan sensor of the liquid-crystal panel illustrated in FIG. 6.

Figure 8:
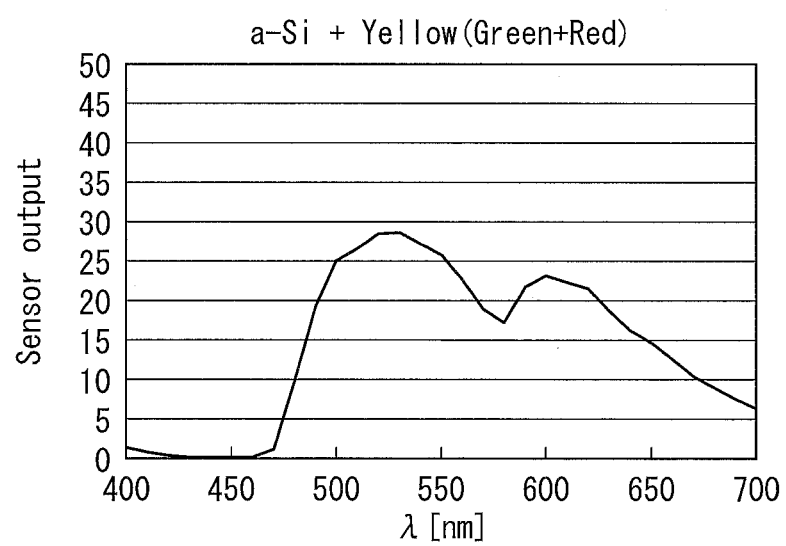

FIG. 8 is a graph showing a spectral sensitivity of a yellow sensor of the liquid-crystal panel illustrated in FIG. 6.

FIG. 9 is a schematic view schematically illustrating (i) a positional information image obtained by a coordinate extracting circuit and (ii) separation of the positional information image.

Figure 10:
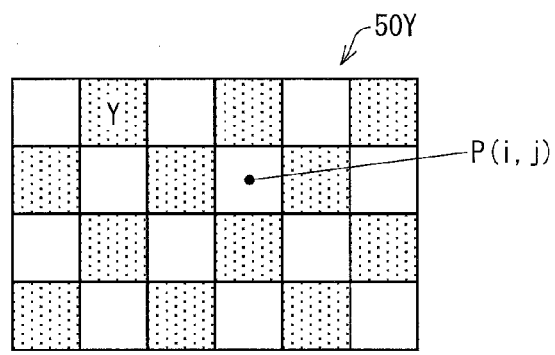

FIG. 10 is a schematic view schematically illustrating an image data interpolation process.

Figure 11:
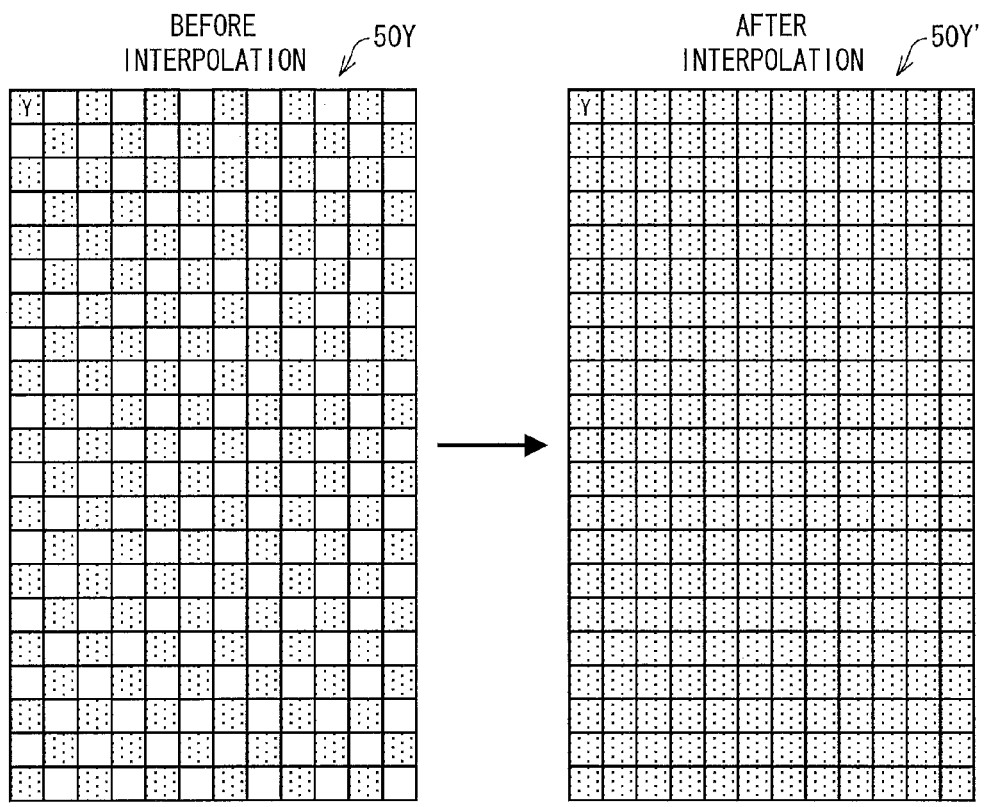

FIG. 11 is a schematic view schematically illustrating an image data interpolation process.

Figure 12:
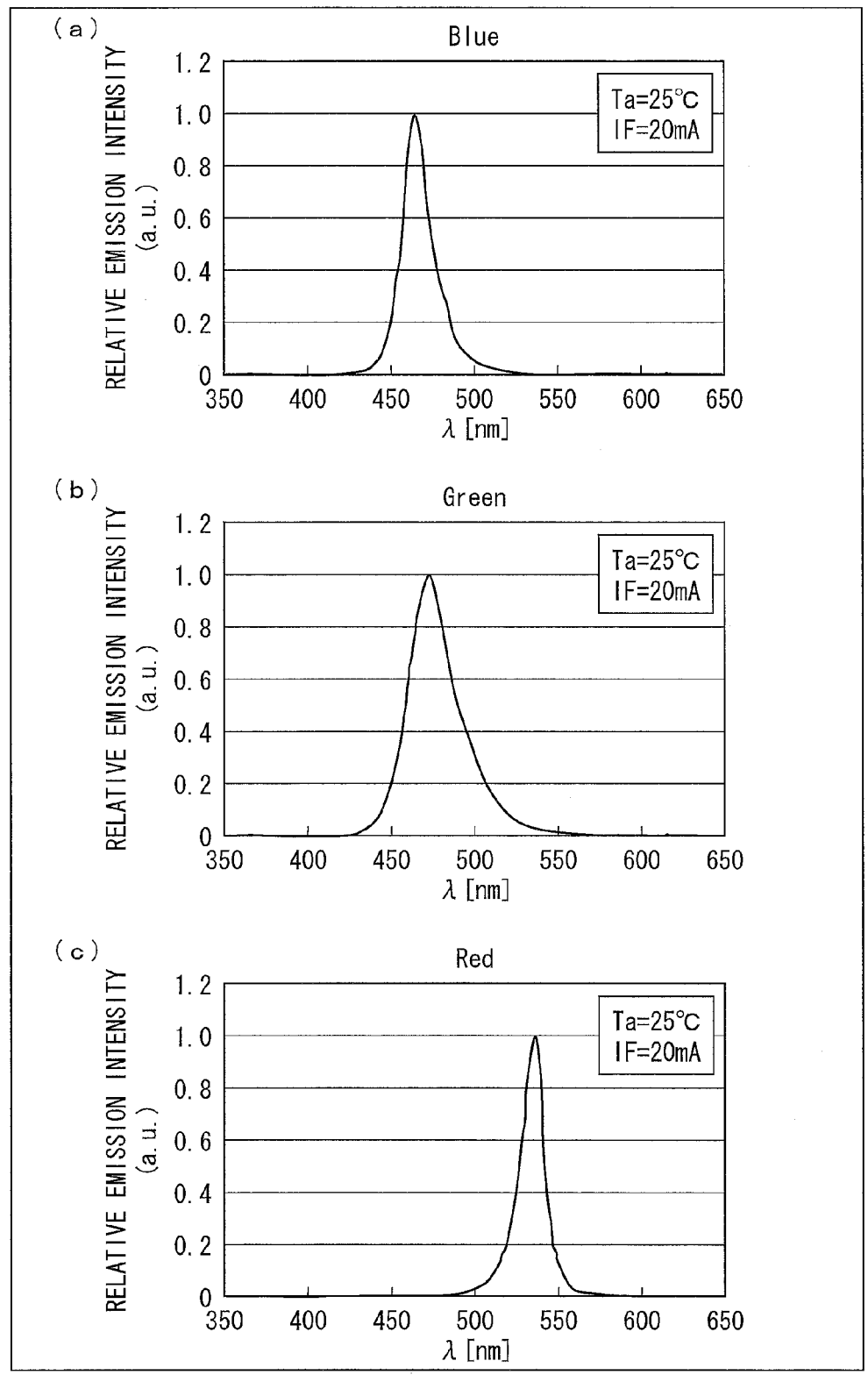

FIG. 12 has graphs showing emission spectra of an input pen for use in simultaneous detection of color information and an input position by the liquid-crystal display device illustrated in FIG. 1. (a) of FIG. 12 shows the emission spectrum of blue light. (b) of FIG. 12 shows the emission spectrum of green light. (c) of FIG. 12 shows the emission spectrum of red light.

FIG. 13 has graphs showing sensor outputs of a cyan sensor and a yellow sensor, respectively, the sensor outputs being obtained when primary color light is emitted from an input pen to a liquid-crystal panel.

Figure 14:
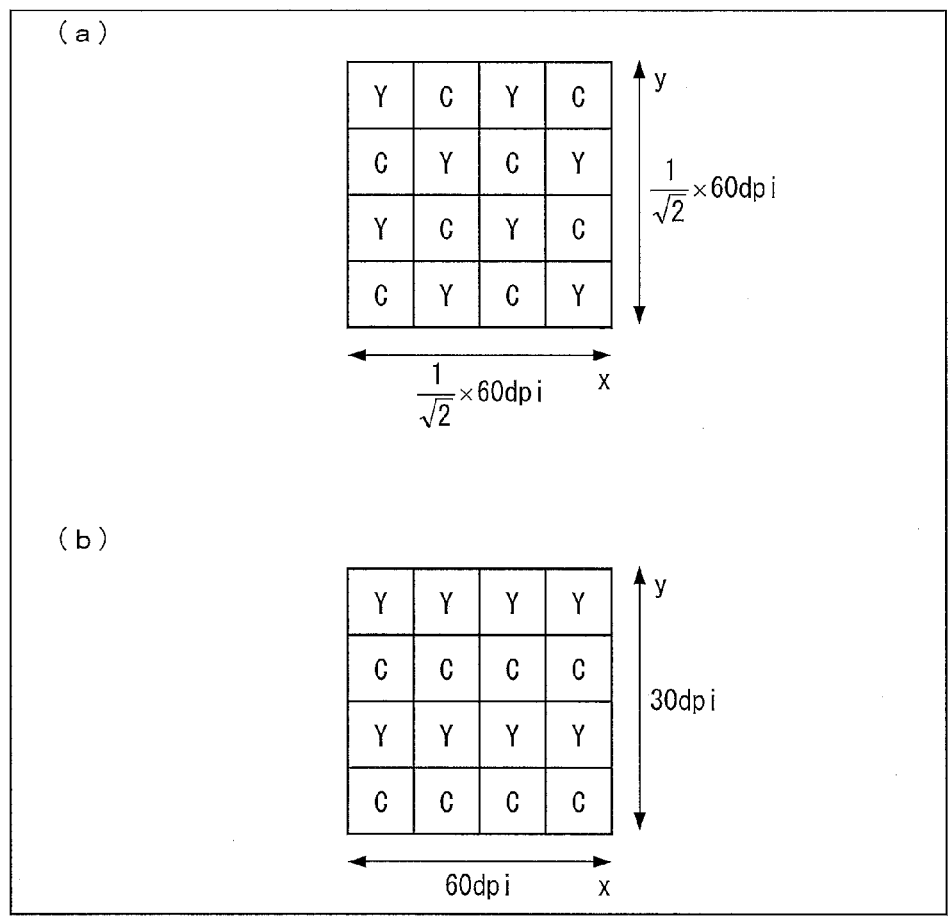

(a) of FIG. 14 is a schematic view illustrating an example of an arrangement of a liquid-crystal panel in which yellow sensors and cyan sensors are provided alternately in a checkered pattern. (b) of FIG. 14 is a schematic view illustrating an example of an arrangement of a liquid-crystal panel in which yellow sensors and cyan sensors are provided alternately for each line.

Figure 15:
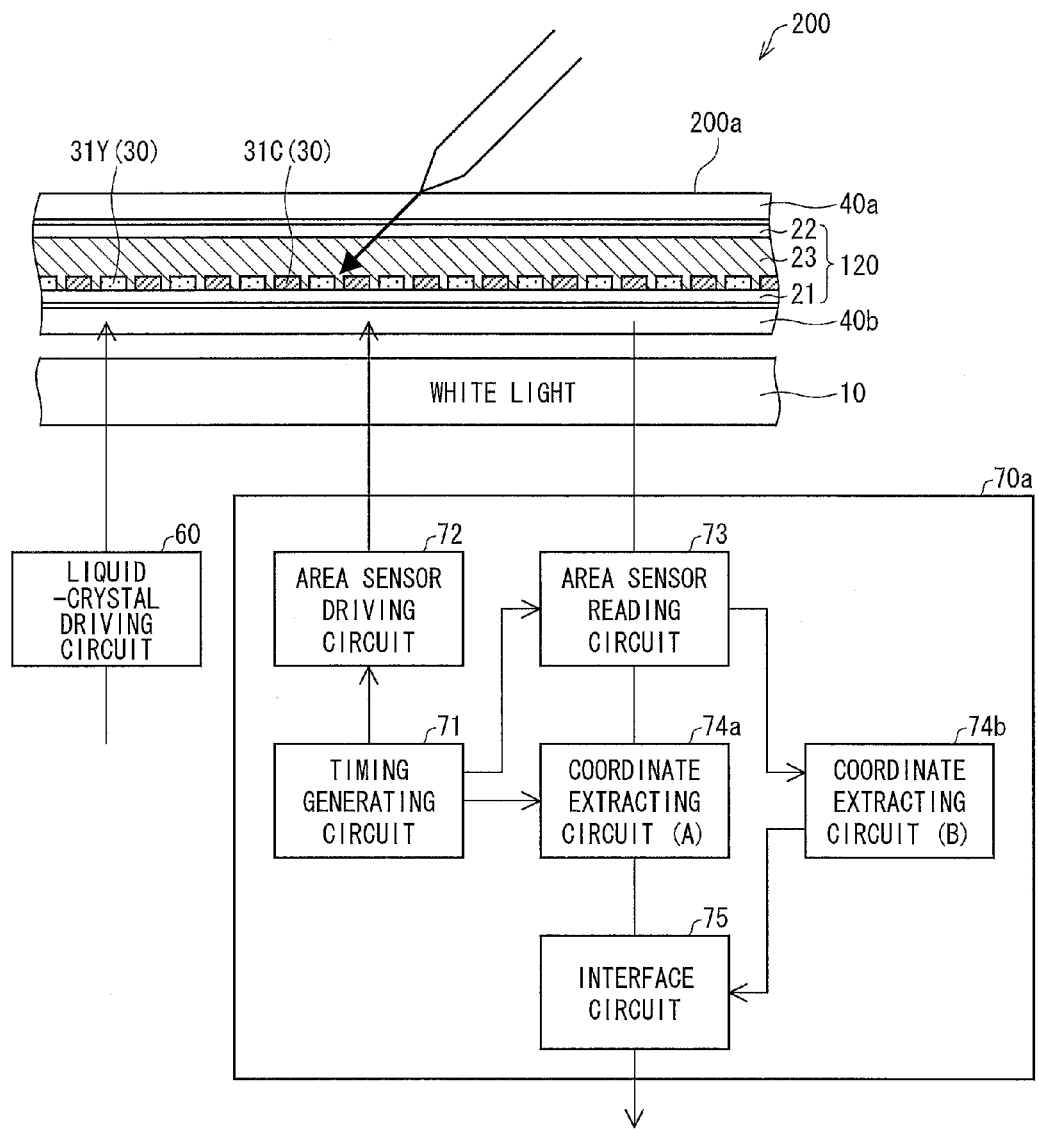

FIG. 15 is a schematic view illustrating an arrangement of a liquid-crystal display device in accordance with a second embodiment of the present invention.

Figure 16:
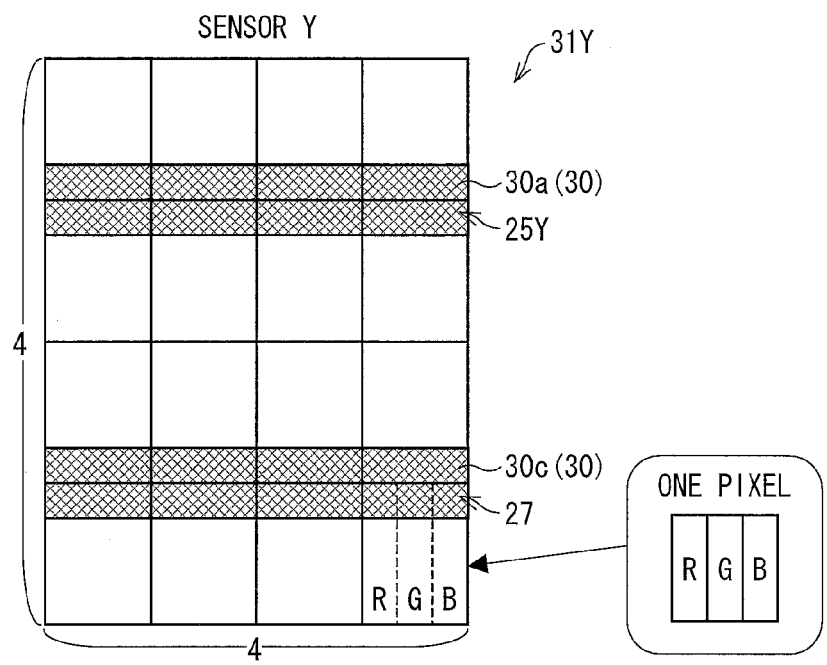

FIG. 16 is a schematic view illustrating a more specific arrangement of a yellow sensor provided in a liquid-crystal display device in accordance with a third embodiment of the present invention.

Figure 17:
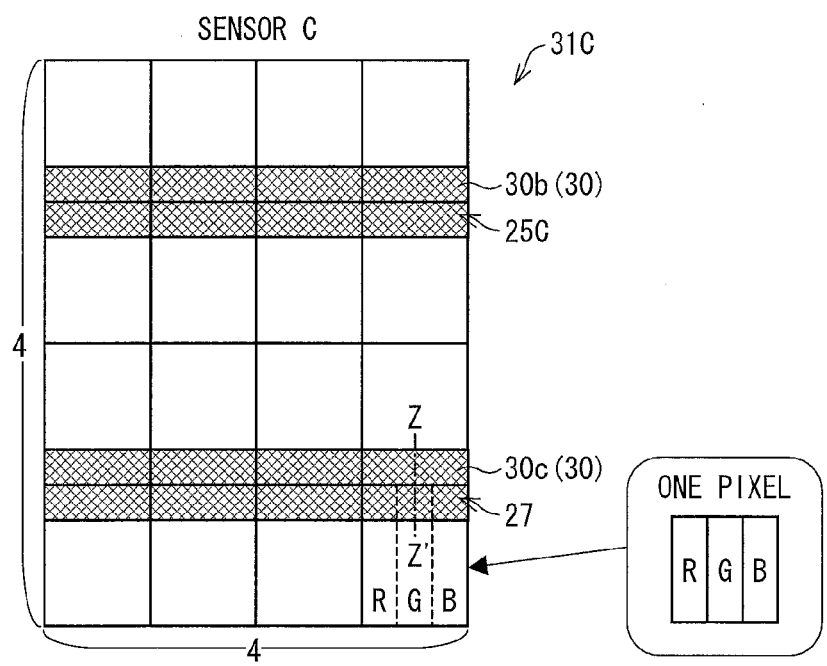

FIG. 17 is a schematic view illustrating a more specific arrangement of a cyan sensor provided in the liquid-crystal display device in accordance with the third embodiment of the present invention.

Figure 18:
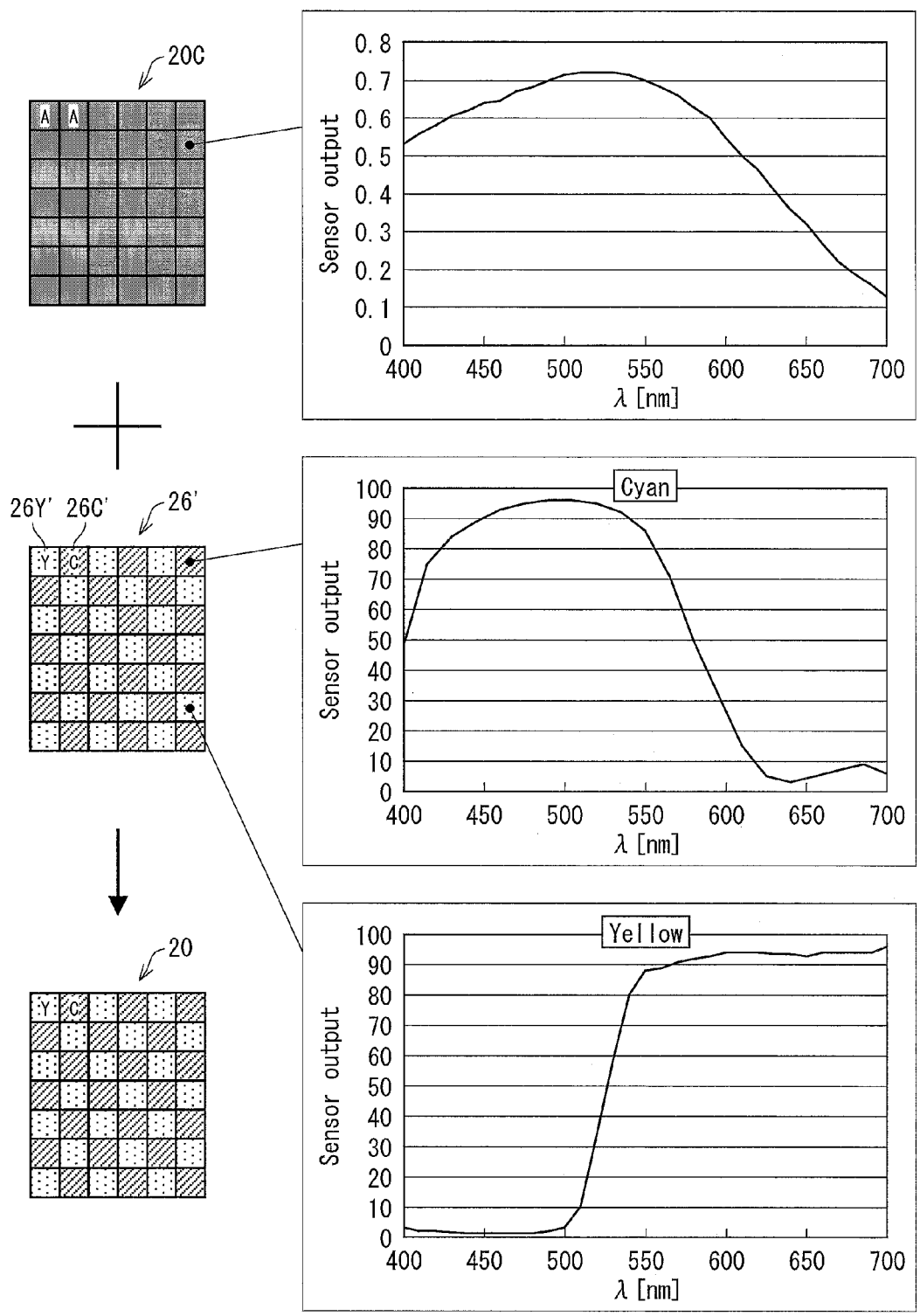

FIG. 18 is a schematic view illustrating an arrangement of a liquid-crystal panel of the liquid-crystal display device in accordance with the third embodiment of the present invention.

Figure 19:
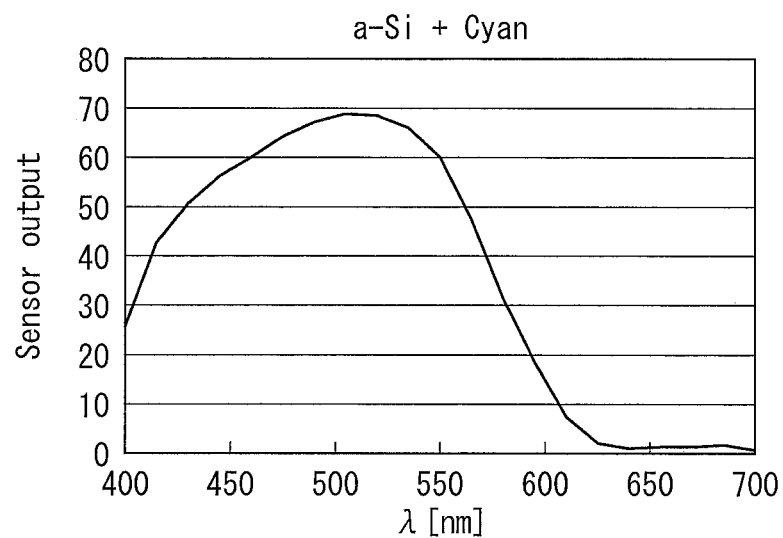

FIG. 19 is a graph showing a spectral sensitivity of a cyan sensor of the liquid-crystal panel illustrated in FIG. 18.

Figure 20:
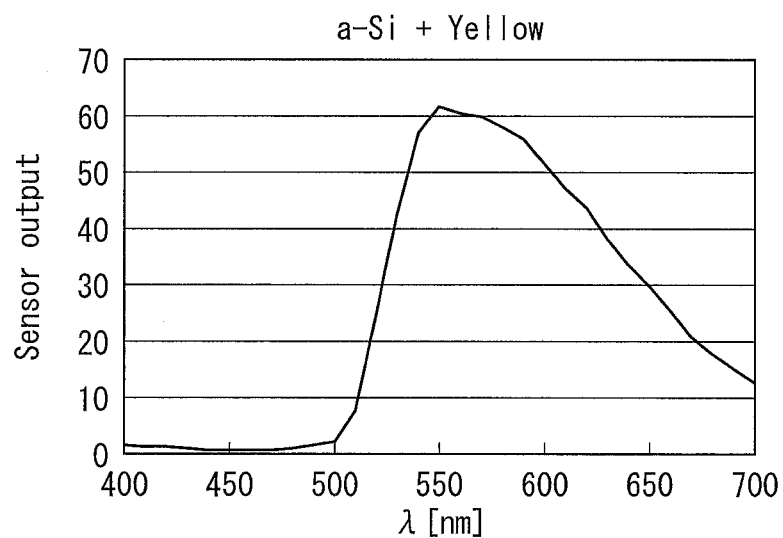

FIG. 20 is a graph showing a spectral sensitivity of a yellow sensor of the liquid-crystal panel illustrated in FIG. 18.

FIG. 21 has graphs showing sensor outputs of a cyan sensor and a yellow sensor, respectively, the sensor outputs being obtained when primary color light is emitted from an input pen to a liquid-crystal panel.

DESCRIPTION OF EMBODIMENTS

First Embodiment

An embodiment of the present invention is described below with reference to FIGS. 1 through 14. Note that the present invention is not limited to the arrangement.

The present embodiment discusses a touch panel integrated liquid-crystal display device having an area sensor function (specifically, a touch panel function).

First, an arrangement of the touch panel integrated liquid-crystal display device of the present embodiment is to be described with reference to FIG. 1. A touch panel integrated liquid-crystal display device 100 (hereinafter simply referred to as a liquid-crystal display device 100) illustrated in FIG. 1 has a touch panel function in which a light sensor element provided for each pixel detects an input position by sensing visible light that enters a top surface of a display panel. Specifically, the liquid-crystal display device 100 has a touch panel function of detecting an input position and color information of an input pen which emits light of any one of red, green, and blue primary colors.

The liquid-crystal display device 100 includes a liquid-crystal panel 20 (position detecting section) and a backlight 10 (light-emitting section) which is provided on a back side of the liquid-crystal panel 20 and emits light to the liquid-crystal panel 20 (see FIG. 1).

The liquid-crystal panel 20 includes an active matrix substrate 21 in which many pixels are provided in a matrix pattern and a counter substrate 22 which is provided so as to face the active matrix substrate 21. The liquid-crystal panel 20 further includes a liquid-crystal layer 23 which serves as a display medium and is provided between the active matrix substrate 21 and the counter substrate 22. Note that a display mode of the liquid-crystal panel 20 is not particularly limited in the present embodiment and that any display mode such as a TN mode, an IPS mode, or a VA mode is applicable.

The liquid-crystal display device 100 is provided with a front side polarizing plate 40a and a back side polarizing plate 40b between which the liquid-crystal panel 20 is provided.

Each of the front side polarizing plate 40a and the back side polarizing plate 40b serves as a polarizer. For example, in a case where a vertical alignment liquid-crystal material is encapsulated in the liquid-crystal layer, a normally black liquid-crystal display device can be made by providing the front side polarizing plate 40a and the back side polarizing plate 40b so that their respective directions of polarization are in a crossed Nicols relationship.

The active matrix substrate 21 mainly includes TFTs (not illustrated) serving as switching elements to drive respective pixels, an alignment film (not illustrated), and yellow sensors 31Y and cyan sensors 31C. Each of a yellow sensor 31Y and a cyan sensor 31C includes light sensor elements 30 provided in respective pixel regions.

The counter substrate 22 mainly includes a color filter layer, a counter electrode, and an alignment film which are not illustrated. The color filter layer includes red (R), green (G), and blue (B) colored parts and a black matrix.

As described earlier, according to the liquid-crystal display device 100, the light sensor elements 30, which are provided in the respective pixel regions, form the yellow sensor 31Y (first sensor) and the cyan sensor 31C (second sensor). An area sensor which detects a position of an input from an outside can be made by causing each of the yellow sensor 31Y and the cyan sensor 31C to sense respective images on a panel surface. In a case where a specific position in a top surface (detection target surface 100a) of the liquid-crystal panel 20 is touched with an input pen or a finger, the light sensor elements 30 read the specific position, so as to supply information to the liquid-crystal display device and to allow the liquid-crystal display device to carry out an intended operation. The liquid-crystal display device 100 of the present embodiment thus allows the light sensor elements 30 to implement a touch panel function.

The light sensor elements 30 are made of a photodiode or a phototransistor and sense a received light amount by a flow of an electric current in accordance with an intensity of received light. The TFTs and the light sensor elements 30 can be monolithically formed on the active matrix substrate 21 by a substantially identical process. Namely, a part of members which constitute the light sensor elements 30 can be formed simultaneously with a part of members which constitute the TFTs. Such a method for forming a light sensor element can be carried out in conformity with a conventional publicly-known method for producing a light sensor element equipped liquid-crystal display device. A material of which the light sensor elements 30 are made is not particularly limited provided that the material is a conventional publicly-known material of which a light sensor element is made. The material of which the light sensor elements 30 are made is exemplified by amorphous silicon.

The backlight 10 emits light to the liquid-crystal panel 20. According to the present embodiment, the backlight 10 emits white light to the liquid-crystal panel 20. Such a backlight that emits white light can be made by a publicly-known method.

According to the present liquid-crystal display device, as optical compensation elements, a front side phase plate (not illustrated in FIG. 1) may be provided between the counter substrate 22 and the front side polarizing plate 40a and a back side phase plate (not illustrated in FIG. 1) may be provided between the active matrix substrate 21 and the back side polarizing plate 40b.

FIG. 1 illustrates a liquid-crystal driving circuit 60 which drives the liquid-crystal panel 20 to carry out a display and an area sensor control section 70 for driving an area sensor. FIG. 1 also illustrates an interior arrangement of the area sensor control section 70. Note that the liquid-crystal driving circuit of the present embodiment can be arranged by a conventional publicly-known method.

The area sensor control section 70 includes a timing generating circuit 71, an area sensor driving circuit 72, an area sensor reading circuit 73, a coordinate extracting circuit 74, and an interface circuit 75 (see FIG. 1).

The timing generating circuit 71 serves as means for supplying a timing signal to each of the area sensor driving circuit 72, the area sensor reading circuit 73, and the coordinate extracting circuit 74, so as to control operations of these respective circuits by causing the operations to synchronize with each other.

The area sensor driving circuit 72 supplies electric power for driving the light sensor elements 30.

The area sensor reading circuit 73 receives received light signals from the respective light sensor elements 30 through which an electric current that differs in value flows in accordance with a received light amount, and the area sensor reading circuit 73 finds received light amounts.

In accordance with the received light amounts of the respective light sensor elements 30, the received light amounts having been found by the area sensor reading circuit 73, the coordinate extracting circuit 74 finds coordinates of an input position of visible light having entered the top surface (detection target surface 100a) of the liquid-crystal panel. The coordinate extracting circuit 74 also discriminates color information of the visible light having entered the top surface of the liquid-crystal panel. Note that the coordinate extracting circuit 74 which has the arrangement illustrated in FIG. 1 operates at a double speed or higher since the coordinate extracting circuit 74 processes both a positional information image obtained by a sensor Y and a positional information image obtained by a sensor C (described later).

The interface circuit 75 supplies, to an outside of the liquid-crystal display device 100, (i) the coordinates of the input position of the visible light, the coordinates having been found by the coordinate extracting circuit 74 and (ii) the color information (positional information) of the visible light. The liquid-crystal display device 100 is connected to, for example, a PC via the interface circuit 75.

Since the liquid-crystal display device 100 is arranged as described above, in a case where the top surface (detection target surface 100a) of the liquid-crystal display device is touched with an input pen, the light sensor elements 30 provided in the liquid-crystal panel 20 can detect an input position by recognizing the input pen as an image.

Subsequently, the following description discusses an arrangement of each of the sensors (yellow sensors 31Y and cyan sensors 31C) provided in the liquid-crystal panel 20. The following description refers to the yellow sensors 31Y as sensors Y and the cyan sensors 31C as sensors C.

Figure 2:
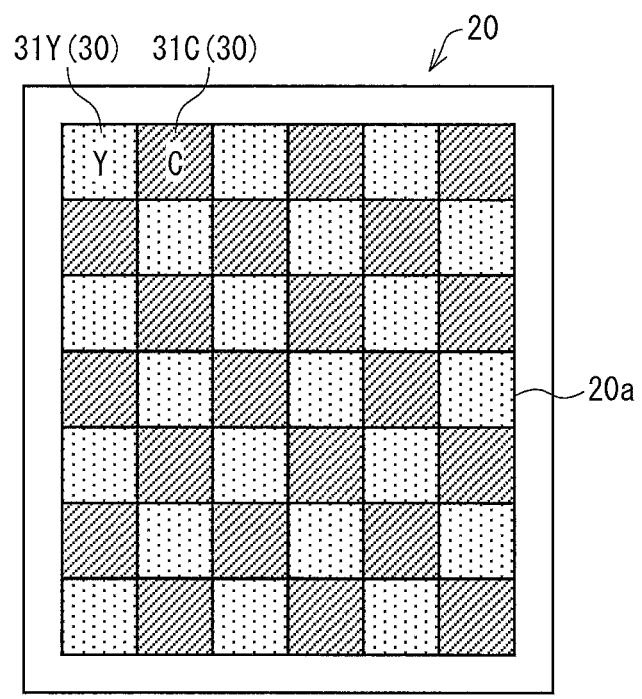
FIG. 2 is a plan view illustrating an arrangement of each sensor provided in a liquid-crystal panel of the liquid-crystal display device illustrated in FIG. 1.

FIG. 2 is a schematic view illustrating each sensor in a display region (an active area) 20a of the liquid-crystal panel 20. In FIG. 2, which does not illustrate a specific arrangement of an inside of the liquid-crystal panel 20, a plurality of data signal lines and a plurality of gate signal lines are provided so as to intersect with each other, and pixel electrodes are provided via TFTs in a vicinity of intersections of the plurality of data signal lines and the plurality of gate signal lines. The color filter layer provided for the counter substrate 22 of the liquid-crystal panel 20 includes the red (R), green (G), and blue (B) colored parts which are provided so as to face the respective pixel electrodes. This allows obtainment of a red pixel electrode, a green pixel electrode, and a blue pixel electrode. One pixel is constituted by three pixel electrodes which are an R pixel electrode, a G pixel electrode, and a B pixel electrode. This causes a plurality of pixels to be provided horizontally and vertically in a matrix pattern in the liquid-crystal panel 20.

According to the liquid-crystal panel 20 of the present liquid-crystal display device, the light sensor elements 30 are provided for the respective pixels in the display region 20a (see FIG. 2). Each of these light sensor elements is a sensor Y or a sensor C. The sensors Y and the sensors C are provided horizontally and vertically in a matrix pattern in accordance with how the respective pixels are provided (see FIG. 2). Further, according to the present embodiment, the sensors Y and the sensors C are provided alternately in a checkered pattern. Note here that the provision "in the checkered pattern" means that the sensors Y and the sensors C are provided alternately and four sensors of one of the sensors Y and the sensors C are provided on four sides of one sensor of the other of the sensors Y and the sensors C.

FIG. 3 is a schematic view illustrating a more specific arrangement of a sensor Y. FIG. 4 is a schematic view illustrating a more specific arrangement of a sensor C. Each of the sensor Y as one unit and the sensor C as one unit includes 16 pixels (4 pixels×4 pixels) in total (see FIGS. 3 and 4). Note that one pixel is constituted by three R, G, and B pixel electrodes (described earlier).

The sensor Y includes a plurality of light sensor elements 30 (see FIG. 3). These plurality of light sensor elements 30 are classified into two types of light sensor elements: a light sensor element 30a and a light sensor element 30c. The light sensor element 30a senses an intensity of green light and red light (a first combination of primary color lights) of received visible light, and the light sensor element 30c is a dark current compensation light sensor for carrying out temperature compensation with respect to the light sensor element 30a.

The sensor C includes a plurality of light sensor elements 30 (see FIG. 4). These plurality of light sensor elements 30 are classified into two types of light sensor elements: a light sensor element 30b and a light sensor element 30c. The light sensor element 30b senses an intensity of blue light and green light (a second combination of primary color lights) of received visible light, and the light sensor element 30c is a dark current compensation light sensor for carrying out temperature compensation with respect to the light sensor element 30b.

Note here that in order to make a more highly accurate sensor, the light sensor element 30c for dark current compensation is provided as a correction sensor for compensating for a detection characteristic of a light sensor which characteristic changes due to an external factor such as a temperature. The light sensor element 30c for dark current compensation can be formed by use of a conventional publicly-known method. The light sensor element 30c included in the sensor Y and the light sensor element 30c included in the sensor C are identical in structure.

FIG. 5 is a cross-sectional view illustrating a schematic arrangement of the light sensor element 30a, the light sensor element 30b, and the light sensor element 30c. (a) of FIG. 5 is a cross-sectional view illustrating an arrangement of a cross section in line X-X' in the sensor Y illustrated in FIG. 3. (b) of FIG. 5 is a cross-sectional view illustrating an arrangement of a cross section in line Y-Y' in the sensor C illustrated in FIG. 4. (c) of FIG. 5 is a cross-sectional view illustrating an arrangement of a cross section in line Z-Z' in each of the sensor Y and the sensor C.

The light sensor element 30a illustrated in (a) of FIG. 5 has a light sensor element 30 which is provided on the active matrix substrate 21. The light sensor element 30a includes an optical filter 25 (25A) which blocks visible light. The optical filter 25 (25A) is provided so as to face the counter substrate 22. Of the red (R), green (G), and blue (B) colored parts of the color filter layer, the optical filter 25 (25A) is provided so as to correspond to the blue (B) colored part which transmits blue light (first primary color light) (see FIG. 3). The optical filter 25A has a structure in which a red color filter 25R and a blue color filter 25B that constitute the colored parts of the color filter layer are stacked. This allows blocking of a blue light component of a visible light component which enters the light sensor element 30. As a result, the light sensor element 30a senses an intensity of green light and red light of received visible light.

As in the case of the light sensor element 30a, the light sensor element 30b illustrated in (b) of FIG. 5 has a light sensor element 30 which is provided on the active matrix substrate 21. The light sensor element 30b includes an optical filter 25 (25A) which blocks visible light. The optical filter 25 (25A) is provided so as to face the counter substrate 22. Of the red (R), green (G), and blue (B) colored parts of the color filter layer, the optical filter 25 (25A) is provided so as to correspond to the red (R) colored part which transmits red light (second primary color light) (see FIG. 4). The optical filter 25A has a structure in which a red color filter 25R and a blue color filter 25B that constitute the colored parts of the color filter layer are stacked. This allows blocking of a red light component of a visible light component which enters the light sensor element 30. As a result, the light sensor element 30b senses an intensity of blue light and green light of received visible light.

As in the case of the light sensor element 30a, the light sensor element 30c illustrated in (c) of FIG. 5 has a light sensor element 30 which is provided on the active matrix substrate 21. Note, however, that the light sensor element 30c is different from the light sensor element 30a in that a black matrix 27 which blocks light is provided so as to correspond to a region on the counter substrate 22 side in which region a light sensor element 30 is provided. This eliminates an electromotive current due to a light intensity from an electromotive current obtained from the light sensor element 30c, so that an electromotive current due to a factor (e.g., a temperature) other than the light intensity can be sensed. The light sensor element 30a and the light sensor element 30b can be corrected by subtracting a detected value of the light sensor element 30c from each of detected values of the light sensor element 30a and the light sensor element b, respectively.

Note here that it is only necessary that the optical filter 25 provided in each of the light sensor element 30a and the light sensor element 30b be a filter having a function of blocking visible light and that the optical filter 25 is not limited to the optical filter 25A having a stacked structure. The optical filter 25 can also be exemplified by an optical filter 25D which is formed by mixing a red pigment, a green pigment, and a blue pigment. (d) of FIG. 5 is a cross-sectional view illustrating a schematic arrangement of the light sensor element 30b including the optical filter 25D. As in the case of the light sensor element 30b illustrated in (b) of FIG. 5, (d) of FIG. 5 illustrates an arrangement of a cross section in line Y-Y' in the sensor C of FIG. 4.

As in the case of the light sensor element 30a, the light sensor element 30b illustrated in (d) of FIG. 5 has a light sensor element 30 which is provided on the active matrix substrate 21. As in the case of the optical filter 25A, the optical filter 25D provided in the light sensor element 30b has a function of blocking visible light. The optical filter 25D is provided so as to face the counter substrate 22. Of the red (R), green (G), and blue (B) colored parts of the color filter layer, the optical filter 25D is provided so as to correspond to the red (R) colored part which transmits red light. This allows blocking of a red light component of a visible light component which enters the light sensor element 30.

As described above, according to the liquid-crystal panel 20 of the present embodiment, it can be said that two types of light sensors of the sensor Y and the sensor C are made in accordance with in which of the colored parts of the color filter layer the optical color filter 25A (or the optical filter 25D) is provided above the light sensor element 30 which is similar in arrangement to a conventional light sensor element. This point is described below with reference to FIGS. 6 through 8.

FIG. 6 shows an example of how the present liquid-crystal display device is made by combining (i) a liquid-crystal panel 20b which is provided with visible light sensors A and (ii) an optical filter structure 26. A graph illustrated on the right upper side of FIG. 6 shows a spectral sensitivity (sensor output for each visible light wavelength) of a visible light sensor A. Graphs illustrated on the right middle side of FIG. 6 show spectral transmittances (light transmittances for each wavelength) of a blue light blocking section 26Y and a red light blocking section 26C, respectively, which are provided in the optical filter structure 26.

The liquid-crystal panel 20c illustrated in FIG. 6 is provided with the visible light sensors A. The visible light sensor A has a certain level of sensitivity in a visible light wavelength range (400 nm to 700 nm) (see the graph on the right upper side of FIG. 6).

The optical filter structure 26 illustrated in FIG. 6 has an arrangement in which blue light blocking sections 26Y and red light blocking sections 26C are provided alternately in a checkered pattern. Each of the blue light blocking section 26Y and the red light blocking section 26C is identical in planar shape and size to the visible light sensor A.

Two graphs on the right middle side of FIG. 6 show spectral transmittances of a blue light blocking section 26Y and a red light blocking section 26C, respectively, of the optical filter structure 26. These graphs show that the blue light blocking section 26Y blocks blue light (i.e., light having a wavelength of less than 500 nm). The graphs also show that the red light blocking section 26C blocks red light (i.e., light having a wavelength of more than 600 nm). A material of which the blue light blocking section 26Y is made is not particularly limited provided that the material has a characteristic of blocking blue light (i.e., light having a wavelength of less than 500 nm) and transmitting red light and green light. In contrast, a material of which the red light blocking section 26C is made is not particularly limited provided that the material has a characteristic of blocking red light (i.e., light having a wavelength of more than 600 nm) and transmitting blue light and green light.

A specific example of an arrangement of the blue light blocking section 26Y is exemplified by an arrangement (described earlier) in which of the red (R), green (G), and blue (B) colored parts of the color filter layer, the optical filter 25 which blocks visible light is provided so as to correspond to the blue (B) colored part which transmits blue light. A specific example of an arrangement of the red light blocking section 26C is exemplified by an arrangement (described earlier) in which of the red (R), green (G), and blue (B) colored parts of the color filter layer, the optical filter 25 which blocks visible light is provided so as to correspond to the blue (R) colored part which transmits red light. The optical filter 25 is exemplified by the optical filter 25A in which the red color filter 25R and the blue colored filter 25B are stacked. Alternatively, the optical filter 25 is exemplified by the optical filter 25D which is formed by mixing a red pigment, a green pigment, and a blue pigment.

According to the optical filter 25A, visible light can be blocked without fail by combining the red color filter and the blue color filter. In addition, the optical filter 25A also has an advantage such that the optical filter structure 26 can be incorporated in the color filter layer which is provided for the counter substrate 22 of the liquid-crystal panel 20.

Further, the optical filter 25D achieves a higher visible light blocking performance as compared to the optical filter 25A obtained by stacking the color filters.

The liquid-crystal panel 20 in which the sensors Y and the sensors C are provided alternately in a checkered pattern is obtained by introducing the optical filter structure 26 into the liquid-crystal panel 20c (see FIG. 6). FIG. 7 is a graph showing a spectral sensitivity of a sensor C of the liquid-crystal panel 20 illustrated in FIG. 6. FIG. 8 is a graph showing a spectral sensitivity of a sensor Y of the liquid-crystal panel 20 illustrated in FIG. 6.

The sensor C responds to a wavelength of blue light and a wavelength of green light in a visible light region (see FIG. 7). This reveals that the sensor C can sense an intensity of light containing both blue light and green light. In contrast, the sensor Y responds to a wavelength of green light and a wavelength of red light in a visible light region (see FIG. 8). This reveals that the sensor Y can sense an intensity of light containing both green light and red light.

According to the liquid-crystal panel 20 having the arrangement, each of two types of light sensors of the sensor Y and the sensor C can sense an image on a panel surface. That is, according to the liquid-crystal panel 20, color information and an input position of an input pen can be detected simultaneously by two types of methods: (i) by causing the sensor Y to detect color information and an input position by use of a touch panel function and (ii) by causing the sensor C to detect color information and an input position by use of a touch panel function.

Subsequently, the following description discusses how the liquid-crystal display device 100 detects color information and an input position.

The liquid-crystal display device 100 compares (i) a positional information image (first positional information image) obtained from the yellow sensor 31Y (sensor Y) and (ii) a positional information image (second positional information image) obtained from the cyan sensor 31C (sensor C). In accordance with a result of the comparison, the liquid-crystal display device 100 detects color information and an input position of visible light having entered the top surface (detection target surface 100a) of the liquid-crystal panel 20.

Specifically, the area sensor driving circuit 72 sequentially carries out division driving with respect to the sensor Y and the sensor C. The area sensor reading circuit 73 receives received light signals of the sensor Y and the sensor C, respectively, the received light signals having been obtained by the division driving, so as to find received light amounts of the sensor Y and the sensor C, respectively. Information of the received light amounts of the sensor Y and the sensor C, respectively, the received light amounts having been obtained by the area sensor reading circuit 73, is transmitted to the coordinate extracting circuit 74 (a color discriminating section). Note that, in a case where an IC carries out a process at an extremely high speed (in a case where time required for coordinate extraction is half or less as long as a reading time of an area sensor), the coordinate extracting circuit 74 can also be driven two times.

In accordance with the information of the received light amounts found by the area sensor reading circuit 73, the coordinate extracting circuit 74 prepares a positional information image constituted by (i) positional information obtained by the sensor Y and (ii) positional information obtained by the sensor C. Then, in the prepared positional information image, the coordinate extracting circuit 74 compares (i) a positional information image obtained by the sensor Y and (ii) a positional information image obtained by the sensor C.

The following description discusses, with reference to FIGS. 9 through 11, how to compare a color tone of the positional information image obtained by the sensor Y and a color tone of the positional information image obtained by the sensor C.

FIG. 9 is a schematic view schematically illustrating (i) the positional information image obtained by the coordinate extracting circuit 74 and (ii) separation of the positional information image. The coordinate extracting circuit 74 obtains a checkered image 50 as the positional information image (see FIG. 9). The checkered image 50 is arranged such that positional information images (pixel regions) obtained by the respective sensors Y and positional information images (pixel regions) obtained by the respective sensors C are provided alternately in a checkered pattern. The coordinate extracting circuit 74 carries out a separation process for separating the checkered image 50 into (i) image data 50Y (first image data) constituted only by the positional information images obtained by the respective sensors Y and (ii) image data 50C (second image data) constituted only by the positional information images obtained by the respective sensors C.

The image data 50Y which has been subjected to the separation process is arranged such that the positional information images (pixel regions) obtained by the respective sensors Y are provided alternately in a staggered pattern. In other words, pixel regions in which no positional information is outputted and the positional information images (pixel regions) obtained by the respective sensors Y are provided alternately.

As in the case of the image data 50Y, the image data 50C which has been subjected to the separation process is arranged such that the positional information images (pixel regions) obtained by the respective sensors C are provided alternately in a staggered pattern. In other words, pixel regions in which no positional information is outputted and the positional information images (pixel regions) obtained by the respective sensors C are provided alternately.

Subsequently, the coordinate extracting circuit 74 carries out, with respect to each of the image data 50Y and the image data 50C, an interpolation process for interpolating the pixel regions in which no positional information is outputted. Then, the coordinate extracting circuit 74 compares detected coordinates (output values) of the image data 50Y and the image data 50C, respectively, which have been subjected to the interpolation. Interpolation processes which are carried out with respect to the image data 50Y and the image data 50C are similar. FIGS. 10 and 11 are schematic views each schematically illustrating the interpolation process with respect to the image data 50Y.

The coordinate extracting circuit 74 uses pixel information of a periphery of a target pixel region P (i, j) which is a pixel region in which no positional information is outputted, and interpolates pixel information (or a sensor output) of the target pixel region P (i, j) (see FIG. 10). Specifically, the coordinate extracting circuit 74 carries out the interpolation process with respect to the target pixel region P (i, j) based on the following equation (1).

[Math. 1]

$$\text{Target Pixel } P(i, j) = \frac{P(i-1, j) + P(i+1, j) + P(i, j-1) + P(i, j+1)}{4} \quad (1)$$

For the pixel regions in which no positional information is outputted, the coordinate extracting circuit 74 sequentially changes coordinates of the target pixel region P (i, j), and interpolates the pixel information of the target pixel region P (i, j) based on the equation (1). As a result, for all the pixel regions in which no positional information is outputted, the image data 51Y is converted to an interpolation image data 50Y' in which pixel information has been interpolated (see FIG. 11).

The coordinate extracting circuit 74 carries out, with respect to the image data 50C, the interpolation process which is similar to the interpolation process (described earlier) with respect to the image data 50Y. Then, the coordinate extracting circuit 74 obtains interpolation image data (for convenience, referred to as interpolation image data 50C') obtained by subjecting the image data 50C to the interpolation.

The coordinate extracting circuit 74 compares detected coordinates between the interpolation image data 50Y' and 50C' thus obtained. In accordance with a result of the comparison, the coordinate extracting circuit 74 detects a color and an input position of visible light having entered the top surface (detection target surface 100a) of the liquid-crystal panel 20.

As described earlier, the positional information obtained by the coordinate extracting circuit 74 is supplied to an outside via the interface circuit 75.

As described above, according to the liquid-crystal display device 100, the area sensor driving circuit 72 sequentially carries out division driving with respect to the sensor Y and the sensor C, and the coordinate extracting circuit 74 carries out a process for detecting positional information from received light amounts obtained from the sensor Y and the sensor C, respectively. This allows a single coordinate extracting circuit to carry out position detection from two types of sensors without the need of providing a coordinate extracting circuit for the sensor Y and a coordinate extracting circuit for the sensor C. This enables a smaller circuit scale and a reduction in amount of information processing.

According to the liquid-crystal display device 100, color information (all the three primary colors) and an input position of visible light having entered the top surface of the liquid-crystal panel 20 can be detected simultaneously by use of two types of sensors: (i) the sensor Y sensing green light and red light and (ii) the sensor C sensing blue light and green light. According to this, the arrangement enables a smaller sensor density as compared to an area sensor in which three sensors that sense light of respective three primary colors are merely provided for each pixel. Especially in a case where an area sensor is introduced into a liquid-crystal panel, the area sensor is required to have an area sensor density of $\sqrt{2/3}$. According to the liquid-crystal display device 100, color information and an input position of visible light having entered the top surface of the liquid-crystal panel 20 can be detected simultaneously even under the requirement of the area sensor density of $\sqrt{2/3}$.

The following description more specifically discusses, with reference to FIGS. 12 and 13, how the liquid-crystal display device 100 detects color information and an input position simultaneously.

FIG. 12 has graphs showing emission spectra of an input pen for use in simultaneous detection of color information and an input position by the liquid-crystal display device 100. (a) of FIG. 12 shows the emission spectrum of blue light. (b) of FIG. 12 shows the emission spectrum of green light. (c) of FIG. 12 shows the emission spectrum of red light. As shown in (a) through (c) of FIG. 12, it is revealed that primary color light emitted from the input pen has a characteristic such that the primary color light has a high light intensity at a wavelength (peak wavelength) in a specific range indicating a color of the primary color light and the primary color light has a light intensity of almost 0 (zero) in the other wavelength ranges. Such a characteristic shows that, in a case where there exists an optical filter which blocks light in a vicinity of a peak wavelength, almost all the primary color light emitted from the input pen is blocked by the optical filter.

FIG. 13 has graphs showing sensor outputs of the sensor C and the sensor Y, respectively, the sensor outputs being obtained when the primary color light is emitted from the input pen to the liquid-crystal panel 20. As shown in FIG. 13, it is revealed that the sensor C responds to blue light and green light which are emitted from the input pen. It is also revealed that the sensor Y responds to green light and red light which are emitted from the input pen.

According to the liquid-crystal display device 100, color information of visible light which is emitted from an input pen can be determined by use of characteristics of the sensor C and the sensor Y, respectively, the characteristics being shown in FIG. 13. The following description discusses, with reference to Table 1, how to determine color information of visible light which is emitted from an input pen. Table 1 shows a relationship between (i) outputs of the sensor C and the sensor Y, respectively and (ii) color information of visible light which is emitted from an input pen.

TABLE 1

| Sensor C | Sensor Y | |
|---|---|---|
| (X1, Y1) | — | (X1, Y1) indicating an input of a blue LED pen |
| (X2, Y2) | (X2, Y2) | (X2, Y2) indicating an input of a green LED pen |
| — | (X3, Y3) | (X3, Y3) indicating an input of a red LED pen |

First, the following description discusses a case where at coordinates (X1, Y1) on the liquid-crystal panel, the output of the sensor C is detected and the output of the sensor Y is not detected. In this case, given that the output is detected from the sensor C which responds to blue light and green light, it is determined first that the visible light which is emitted from the input pen is blue light or green light. In contrast, given that the output is not detected from the sensor Y which responds to green light and red light, it is determined that the visible light which is emitted from the input pen is neither green light nor red light. In a case where these determinations are integrated, it is determined in the liquid-crystal display device 100 that visible light having entered the coordinates (X1, Y1) is blue light (i.e., the coordinates (X1, Y1) indicating an input of a blue LED pen).

Next, the following description discusses a case where at coordinates (X2, Y2) on the liquid-crystal panel, both the output of the sensor C and the output of the sensor Y are detected. In this case, given that the output is detected from the sensor C which responds to blue light and green light, it is determined first that the visible light which is emitted from the input pen is blue light or green light. Further, given that the output is detected from the sensor Y which responds to green light and red light, it is determined that the visible light which is emitted from the input pen is green light or red light. In a case where these determinations are integrated, it is determined in the liquid-crystal display device 100 that visible light having entered the coordinates (X2, Y2) is green light (i.e., the coordinates (X2, Y2) indicating an input of a green LED pen).

Further, the following description discusses a case where at coordinates (X3, Y3) on the liquid-crystal panel, the output of the sensor C is not detected and the output of the sensor Y is detected. In this case, given that the output is not detected from the sensor C which responds to blue light and green light, it is determined first that the visible light which is emitted from the input pen is neither blue light nor green light. In contrast, given that the output is detected from the sensor Y which responds to green light and red light, it is determined that the visible light which is emitted from the input pen is green light or red light. In a case where these determinations are integrated, it is determined in the liquid-crystal display device 100 that visible light having entered the coordinates (X3, Y3) is red light (i.e., the coordinates (X1, Y1) indicating an input of a red LED pen).

As described earlier, according to the liquid-crystal display device 100, color information (all the three primary colors) and an input position of visible light having entered the top surface of the liquid-crystal panel 20 can be detected simultaneously by use of two types of sensors: (i) the sensor Y sensing green light and red light and (ii) the sensor C sensing blue light and green light.

Note that the embodiment described above takes, as an example, an arrangement in which the sensors Y and the sensors C are provided in a checkered pattern. However, the present invention is not limited to such an arrangement. The sensors Y and the sensors C may be provided at random or may be provided alternately for each line.

However, from the viewpoint of minimization of a reduction in resolution due to provision of two types of light sensors, it is preferable that the sensors Y and the sensors C be provided in a checkered pattern as in the case of the present embodiment.

The following description discusses this point with reference to (a) and (b) of FIG. 14. (a) of FIG. 14 shows an example of an arrangement in which the sensors Y and the sensors C are provided alternately in a checkered pattern. (b) of FIG. 14 shows an example of an arrangement in which the sensors Y and the sensors C are provided alternately for each line.

For example, assume that the liquid-crystal panel in which only the sensors Y are provided vertically and horizontally in a matrix pattern has a resolution of 60 dpi (dot/inch). In a case where two types of sensors (the sensors Y and the sensors C) are provided in a checkered pattern, the liquid-crystal panel has a resolution of $(1/\sqrt{2}) \times 60 \approx 42$ dpi both in a horizontal direction (x direction) and in a vertical direction (y direction) (see (a) of FIG. 14).

In contrast, in a case where two types of sensors (the sensors Y and the sensors C) are provided alternately for each line, the liquid-crystal panel continues to have a resolution of 60 dpi in the horizontal direction (x direction), whereas the liquid-crystal panel has a resolution of $½ \times 60 = 30$ dpi in the vertical direction (y direction) (see (b) of FIG. 14). In this case, the liquid-crystal panel has a smaller resolution in the vertical direction as the entire resolution. Further, a difference in resolution occurs between the vertical direction and the horizontal direction.

As described earlier, in a case where the total number of light sensors is constant, the arrangement in which the sensors Y and the sensors C are provided in a checkered pattern can minimize a reduction in resolution due to provision of two types of light sensors as compared to an area sensor constituted only by light sensors of one type.

The embodiment described above takes, as an example, an arrangement in which a light sensor element is provided for each pixel. However, according to the present invention, a light sensor element does not necessarily need to be provided for each pixel. Alternatively, according to the present invention, a light sensor element may be provided for each one of R, G, and B pixel electrodes constituting each pixel.

Note that the present embodiment describes an example using two types of sensors: (i) the sensor Y sensing green light and red light and (ii) the sensor C sensing blue light and green light. However, the present invention is not necessarily limited to such a combination as to a combination of primary color lights to be sensed by two types of sensors. It is only necessary that combinations of primary color lights to be sensed by two types of sensors be different from each other.

Second Embodiment

A second embodiment of the present invention is described below. A liquid-crystal display device of the present embodiment includes a coordinate extracting circuit for a sensor Y and a coordinate extracting circuit for a sensor C. The following description more specifically discusses an arrangement of the liquid-crystal display device of the present embodiment. FIG. 15 is a schematic view illustrating a schematic arrangement of a liquid-crystal display device 200 of the present embodiment.

The liquid-crystal display device 200 has a touch panel function in which a light sensor element provided for each pixel detects an input position by sensing an image on a top surface of a display panel (see FIG. 15). The liquid-crystal display device 200 of the present embodiment, which is a touch panel integrated liquid-crystal display device, includes a liquid-crystal panel 120 (position detecting section) and a backlight 10 (light-emitting section) which is provided on a back side of the liquid-crystal panel 120 and emits light to the liquid-crystal panel 120 (see FIG. 15).

The liquid-crystal panel 120 is substantially identical in arrangement to the liquid-crystal panel 20 which is described in the First Embodiment and provided in the liquid-crystal display device 100. Therefore, the following description discusses only a point of difference between the liquid-crystal panel 120 and the liquid-crystal panel 20. Note that, since the backlight 10 of the present embodiment is identical in arrangement to the backlight 10 which is described in the First Embodiment and provided in the liquid-crystal display device 100, a description thereof is to be omitted.

The liquid-crystal display device 200 includes a liquid-crystal driving circuit 60 which drives the liquid-crystal panel 120 to carry out a display and an area sensor control section 70a for driving an area sensor. FIG. 15 also illustrates an interior arrangement of the area sensor control section 70a. Note that the liquid-crystal driving circuit of the present embodiment can be arranged by a conventional publicly-known method.

The area sensor control section 70a includes a timing generating circuit 71, an area sensor driving circuit 72, an area sensor reading circuit 73, a coordinate extracting circuit (A) 74a, a coordinate extracting circuit (B) 74b, and an interface circuit 75 (see FIG. 15).

The timing generating circuit 71 generates a timing signal for controlling operations of the respective circuits.

The area sensor driving circuit 72 supplies electric power for driving light sensor elements 30.

The area sensor reading circuit 73 receives received light signals from the respective light sensor elements 30 through which an electric current that differs in value flows in accordance with a received light amount, and the area sensor reading circuit 73 finds received light amounts.

In accordance with the received light amounts of the respective light sensor elements 30, the received light amounts having been found by the area sensor reading circuit 73, each of the coordinate extracting circuit (A) 74a and the coordinate extracting circuit (B) 74b finds coordinates of an input pen with which the top surface (detection target surface 200a) of the liquid-crystal panel has been touched. Note that the coordinate extracting circuit (A) 74a finds the coordinates of the input pen in accordance with light sensor elements 30a of the sensor Y and the coordinate extracting circuit (B) 74b finds the coordinates of the input pen in accordance with light sensor elements 30b of the sensor C.

The interface circuit 75 supplies, to an outside of the liquid-crystal display device 200, (i) information (positional information) of the coordinates found by the coordinate extracting circuit (A) 74a and the coordinate extracting circuit (B) 74b and (ii) color information of the input pen. The liquid-crystal display device 200 is connected to, for example, a PC via the interface circuit 75.

Next, the following description discusses how the area sensor control section 70a (see FIG. 15) carries out a process for detecting positional information.

First, the area sensor driving circuit 72 drives sensors Y and sensor C simultaneously.

The area sensor reading circuit 73 finds pieces of information of received light amounts sensed by the sensor Y and the sensor C, respectively. Thereafter, the area sensor reading circuit 73 supplies the piece of information from the sensor Y to the coordinate extracting circuit (A) 74a, and supplies the piece of information from the sensor C to the coordinate extracting circuit (B) 74b.

The liquid-crystal display device 200 causes the coordinate extracting circuit (A) 74a and the coordinate extracting circuit (B) 74b to carry out their respective processes simultaneously, so as to carry out a coordinate extracting process in accordance with received light amounts sensed by the sensor Y and the sensor C, respectively. After carrying out the coordinate extracting process, the liquid-crystal display device 200 prepares a positional information image constituted by (i) positional information obtained by the sensor Y and (ii) positional information obtained by the sensor C. Then, in the prepared positional information image, the liquid-crystal display device 200 compares (i) a color tone of a positional information image obtained by the sensor Y and (ii) a color tone of a positional information image obtained by the sensor C, so as to detect an input position and color information of an input pen. Note that, since a method for comparing the color tone of the positional information image obtained by the sensor Y and the color tone of the positional information image obtained by the sensor C is similar to the method described in the First Embodiment, a description thereof is to be omitted.

The interface circuit 75 detects an input position in accordance with information to be obtained from both the two coordinate extracting circuits.

The liquid-crystal display device 200 carries out the coordinate extracting process in accordance with received light amounts of the sensor Y and the sensor C, respectively by driving the sensor Y and the sensor C simultaneously and causing the coordinate extracting circuit (A) 74a and the coordinate extracting circuit (B) 74b to carry out their respective processes simultaneously. Therefore, the liquid-crystal display device 200 can carry out the coordinate extracting process in a shorter time than the liquid-crystal display device 100 which sequentially carries out division driving with respect to the sensor Y and the sensor C.

As described earlier, according to the liquid-crystal display device 200 of the present embodiment, color information (all the three primary colors) and an input position of visible light having entered the top surface of the liquid-crystal panel 20 can be detected simultaneously by use of two types of sensors: (i) the sensor Y sensing green light and red light and (ii) the sensor C sensing blue light and green light.

Third Embodiment

A third embodiment of the present invention is described below. A liquid-crystal display device of the present embodiment includes (i) a yellow color filter (a color filter having a transmission characteristic of two colors constituting a first combination) 25Y which is provided as an optical filter of a sensor Y and (ii) a cyan color filter (a color filter having a transmission characteristic of two colors constituting a second combination) 25C which is provided as an optical filter of a sensor C. FIG. 16 is a schematic view illustrating a more specific arrangement of the sensor Y of the liquid-crystal display device of the present embodiment. FIG. 17 is a schematic view illustrating a more specific arrangement of the sensor C of the liquid-crystal display device of the present embodiment. Each of the sensor Y as one unit and the sensor C as one unit includes 16 pixels (4 pixels×4 pixels) in total (see FIGS. 16 and 17). Note that as in the case of the sensor Y and the sensor C of the First Embodiment, one pixel is constituted by three R, G, and B pixel electrodes.

The sensor Y includes a plurality of light sensor elements 30 (see FIG. 16). These plurality of light sensor elements 30 are classified into two types of light sensor elements: a light sensor element 30*a* and a light sensor element 30*c*. The light sensor element 30*a* senses an intensity of green light and red light (a first combination of primary color lights) of received visible light, and the light sensor element 30*c* is a dark current compensation light sensor for carrying out temperature compensation with respect to the light sensor element 30*a*.

The light sensor element 30*a* is provided with the yellow color filter 25Y. The yellow color filter 25Y is provided on the counter substrate 22 side so as not to overlap any red (R), green (G), and blue (B) colored parts of a color filter layer. Namely, the yellow color filter 25Y is provided separately as in the case of the red (R), green (G), and blue (B) colored parts. This allows blocking of a blue light component of a visible light component which enters the light sensor elements 30. As a result, the light sensor element 30*a* senses an intensity of green light and red light of received visible light.

Note that, even in a case where the yellow color filter 25Y is provided so as to overlap all the red (R), green (G), and blue (B) colored parts of the color filter layer, the yellow color filter 25Y is expected to yield an effect of sensing an intensity of green light and red light of received visible light (not responding to blue light). However, in this case, a decrease in light due to the yellow color filter 25Y may cause a decrease in output of the light sensor elements 30. Therefore, the liquid-crystal display device of the present embodiment is desirably arranged such that the yellow color filter 25Y is provided so as not to overlap any red (R), green (G), and blue (B) colored parts of the color filter layer.

The sensor C includes a plurality of light sensor elements 30 (see FIG. 17). These plurality of light sensor elements 30 are classified into two types of light sensor elements: a light sensor element 30*b* and a light sensor element 30*c*. The light sensor element 30*b* senses an intensity of blue light and green light (a second combination of primary color lights) of received visible light, and the light sensor element 30*c* is a dark current compensation light sensor for carrying out temperature compensation with respect to the light sensor element 30*b*.

The light sensor element 30*b* is provided with the cyan color filter 25C. The yellow color filter 25C is provided on the counter substrate 22 side so as not to overlap any red (R), green (G), and blue (B) colored parts of a color filter layer. Namely, the cyan color filter 25C is provided separately as in the case of the red (R), green (G), and blue (B) colored parts. This allows blocking of a red light component of a visible light component which enters the light sensor elements 30. As a result, the light sensor element 30*b* senses an intensity of blue light and green light of received visible light.

Note that, even in a case where the cyan color filter 25C is provided so as to overlap all the red (R), green (G), and blue (B) colored parts of the color filter layer, the cyan color filter 25C is expected to yield an effect of sensing an intensity of blue light and green light of received visible light (not responding to red light). However, in this case, a decrease in light due to the cyan color filter 25C may cause a decrease in output of the light sensor elements 30. Therefore, the liquid-crystal display device of the present embodiment is desirably arranged such that the cyan color filter 25C is provided so as not to overlap any red (R), green (G), and blue (B) colored parts of the color filter layer.

Note that, since the light sensor element 30*c* illustrated in each of FIGS. 16 and 17 is similar to the light sensor element 30*c* of the First Embodiment, a description thereof is to be omitted.

As described earlier, it can be said that according to the liquid-crystal panel 20 of the present embodiment, two types of light sensors of the sensor Y and the sensor C are made by whether or not to provide the yellow filter 25Y (or the cyan filter 25C) above the light sensor element 30 which is similar in arrangement to a conventional light sensor element. The following description discusses this point with reference to FIGS. 18 through 20.

FIG. 18 shows an example of how the present liquid-crystal display device is made by combining (i) a liquid-crystal panel 20*b* which is provided with visible light sensors A and (ii) an optical filter structure 26'. A graph illustrated on the right upper side of FIG. 18 shows a spectral sensitivity (sensor output for each visible light wavelength) of a visible light sensor A. Graphs illustrated on the right middle side of FIG. 18 show spectral transmittances (light transmittances for each wavelength) of a blue light blocking section 26Y' and a red light blocking section 26C', respectively, which are provided in the optical filter structure 26'.

The liquid-crystal panel 20*c* illustrated in FIG. 18 is provided with the visible light sensors A. The visible light sensor A has a certain level of sensitivity in a visible light wavelength range (400 nm to 700 nm) (see the graph on the right upper side of FIG. 18). The optical filter structure 26' has an arrangement in which blue light blocking sections 26Y' and red light blocking sections 26C' are provided alternately in a checkered pattern. Each of the blue light blocking section 26Y' and the red light blocking section 26C' is identical in planar shape and size to the visible light sensor A.

Two graphs on the right middle side of FIG. 18 show spectral transmittances of a blue light blocking section 26Y' and a red light blocking section 26C', respectively, of the optical filter structure 26'. These graphs show that the blue light blocking section 26Y' blocks blue light (i.e., light having a wavelength of less than 500 nm). The graphs also show that the red light blocking section 26C' blocks red light (i.e., light having a wavelength of more than 600 nm). A material of which the blue light blocking section 26Y' is made is not particularly limited provided that the material has a characteristic of blocking blue light (i.e., light having a wavelength of less than 500 nm) and transmitting red light and green light. In contrast, a material of which the red light blocking section 26C' is made is not particularly limited provided that the material has a characteristic of blocking red light (i.e., light having a wavelength of more than 600 nm) and transmitting blue light and green light.

A specific example of an arrangement of the blue light blocking section 26Y' is exemplified by an arrangement (described earlier) in which the yellow color filter 25Y is provided. A specific example of an arrangement of the red light blocking section 26C' is exemplified by an arrangement (described earlier) in which the cyan color filter 25C is provided.

Blue light can be blocked without fail by providing the yellow color filter 25Y. Further, red light can be blocked without fail by providing the cyan color filter 25C. In addition, each of the yellow color filter 25Y and the cyan color filter 25C also has an advantage such that the optical filter structure 26 can be incorporated in the color filter layer which is provided for the counter substrate 22 of the liquid-crystal panel 20.

The liquid-crystal panel 20 in which sensors Y and sensors C are provided alternately in a checkered pattern is obtained by introducing the optical filter structure 26' into the liquid-crystal panel 20*c* (see FIG. 18). FIG. 19 is a graph showing a spectral sensitivity of a sensor C of the liquid-crystal panel 20 illustrated in FIG. 18. FIG. 20 is a graph showing a spectral sensitivity of a sensor Y of the liquid-crystal panel 20 illustrated in FIG. 18.

The sensor C responds to a wavelength of blue light and a wavelength of green light in a visible light region (see FIG. 19). This reveals that the sensor C can sense an intensity of light containing both blue light and green light. In contrast, the sensor Y responds to a wavelength of green light and a wavelength of red light in a visible light region (see FIG. 20). This reveals that the sensor Y can sense an intensity of light containing both green light and red light.

According to the liquid-crystal panel 20 having the arrangement, each of two types of light sensors of the sensor Y and the sensor C can sense an image on a panel surface. That is, according to the liquid-crystal panel 20, color information and an input position of an input pen can be detected simultaneously by two types of methods: (i) by causing the sensor Y to detect color information and an input position by use of a touch panel function and (ii) by causing the sensor C to detect color information and an input position by use of a touch panel function.

Since how the liquid-crystal display device of the present embodiment detects color information and an input position is similar to that of the First Embodiment, a description thereof is to be omitted.

The following description specifically discusses, with reference to FIG. 21, simultaneous detection of color information and an input position of an input pen by the liquid-crystal display device of the present embodiment. Note that the input pen emits primary color lights shown in respective (a) through (c) of FIG. 12.

FIG. 21 has graphs showing sensor outputs of the sensor C and the sensor Y, respectively, the sensor outputs being obtained when the primary color light is emitted from the input pen to the liquid-crystal panel 20. As shown in FIG. 21, it is revealed that the sensor C responds to blue light and green light which are emitted from the input pen. It is also revealed that the sensor Y responds to green light and red light which are emitted from the input pen.

According to the liquid-crystal display device of the present embodiment, color information of visible light which is emitted from an input pen can be determined by use of characteristics of the sensor C and the sensor Y, respectively, the characteristics being shown in FIG. 21. Color information of visible light which is emitted from an input pen can be determined in accordance with the relationship shown in Table 1 of the First Embodiment.

As described earlier, according to the liquid-crystal display device of the present embodiment, color information (all the three primary colors) and an input position of visible light having entered the top surface of the liquid-crystal panel 20 can be detected simultaneously by use of two types of sensors: (i) the sensor Y sensing green light and red light and (ii) the sensor C sensing blue light and green light.

As described earlier, an area sensor of the present invention includes: at least one first sensor which includes a first light sensor element that senses an intensity of light of a first combination of two primary colors from among red, blue, and green; at least one second sensor which includes a second light sensor element that senses an intensity of light of a second combination of two primary colors from among red, blue, and green, the two primary colors being different from the two primary colors constituting the first combination; and a position detecting section which detects color information and an input position of visible light by causing the at least one first sensor and the at least one second sensor to sense respective input images of the visible light on a detection target surface.

As described earlier, a liquid-crystal display device includes: at least one first sensor which includes a first light sensor element that senses an intensity of light of a first combination of two primary colors from among red, blue, and green; at least one second sensor which includes a second light sensor element that senses an intensity of light of a second combination of two primary colors from among red, blue, and green, the two primary colors being different from the two primary colors constituting the first combination; and a position detecting section which detects color information and an input position of visible light by causing the at least one first sensor and the at least one second sensor to sense respective input images of the visible light on a panel surface.

The area sensor of the present invention is preferably arranged to further include: three color filters which are a red color filter, a blue color filter, and a green color filter, the first light sensor element being provided with an optical filter which blocks visible light and is provided for a color filter from among the three color filters, the color filter transmitting light of a first primary color which is other than the two primary colors constituting the first combination, and the second light sensor element being provided with an optical filter which blocks visible light and is provided for a color filter from among the three color filters, the color filter transmitting light of a second primary color which is other than the two primary colors constituting the second combination.

According to the arrangement, the first light sensor element included in the at least one first sensor allows an optical filter to receive light in which light of a first primary color which is other than the two primary colors constituting the first combination has been cut. Meanwhile, the second light sensor element included in the at least one second sensor allows an optical filter to receive light in which light of a second primary color which is other than the two primary colors constituting the second combination has been cut. This allows obtainment of the at least one first sensor and the at least one second sensor each of which is capable of securely detecting an intensity of light in a wavelength region of a color obtained by the first combination and the second combination for each of received primary color lights of the first combination and the second combination, respectively.

Note that the area sensor mentioned above may be arranged as below.

Namely, the area sensor may be arranged such that: each of the at least one first sensor and the at least one second sensor has at least one of three color filters which are a red color filter, a blue color filter, and a green color filter; the first light sensor element is provided with (i) a color filter of the two primary colors constituting the first combination and (ii) an optical filter which blocks visible light; and the second light sensor element is provided with (i) a color filter of the two primary colors constituting the second combination and (ii) an optical filter which blocks visible light.

According to the arrangement, the first light sensor element receives light of the two primary colors constituting the first combination and allows an optical filter to cut light of the other colors. Meanwhile, the second light sensor element receives light of the two primary colors constituting the second combination and allows an optical filter to cut light of the other colors. This allows obtainment of the at least one first sensor and the at least one second sensor each of which is capable of securely detecting an intensity of light in a wavelength region of a color obtained by the first combination and the second combination for each of received primary color lights of the first combination and the second combination, respectively.

The area sensor mentioned above is preferably arranged such that the optical filter has a structure in which the red color filter and the blue color filter are stacked.

The arrangement allows obtainment of an optical filter which can block visible light without fail.

The area sensor mentioned above is preferably arranged such that the optical filter is formed by mixing a red pigment, a green pigment, and a blue pigment.

The arrangement allows obtainment of an optical filter which can block visible light without fail. The arrangement also allows a filter to have a thinner thickness as compared to a structure in which color filters are stacked.

The area sensor area sensor of the present invention may be arranged such that: the first light sensor element includes a color filter which has an average transmission characteristic of the two primary colors constituting the first combination; and the second light sensor element includes a color filter which has an average transmission characteristic of the two primary colors constituting the second combination. Note here that "a color filter which has an average transmission characteristic of two primary colors" refers to a color filter which has an average transmission characteristic (property) for one of the two primary colors and has a transmission characteristic (property) that is lower than an average of transmission characteristics (properties) of the respective two colors for the other of the two primary colors.

According to this, the first light sensor element included in the at least one first sensor allows an optical filter to receive light in which light of a first primary color which is other than the two primary colors constituting the first combination has been cut. Meanwhile, the second light sensor element included in the at least one second sensor allows an optical filter to receive light in which light of a second primary color which is other than the two primary colors constituting the second combination has been cut. This allows obtainment of the at least one first sensor and the at least one second sensor each of which is capable of securely detecting an intensity of light in a wavelength region of a color obtained by the first combination and the second combination for each of received primary color lights of the first combination and the second combination, respectively.

The area sensor area sensor of the present invention is preferably arranged to further include: a color discriminating section which compares (i) a first positional information image obtained from the at least one first sensor and (ii) a second positional information image obtained from the at least one second sensor and discriminates, in accordance with a result of the comparison, color information of visible light which enters a detection target surface. Note that a "positional information image" herein refers to a distribution on a detection target surface of strength and weakness of an intensity of primary color light received by each of the at least one first sensor and the at least one second sensor.

According to the arrangement, a color discriminating section compares (i) a first positional information image obtained from the at least one first sensor and (ii) a second positional information image obtained from the at least one second sensor and discriminates, in accordance with a result of the comparison, color information of visible light which enters a detection target surface. Therefore, for example, a color tone of an optical pen which enters a detection target surface can be discriminated accurately.

The area sensor mentioned above is preferably arranged such that: the color discriminating section separates, into (i) first image data constituted only by the first positional information image and (ii) second image data constituted only by the second positional information image, a positional information image which is obtained from the position detecting section; for each of the first image data and the second image data, the color discriminating section interpolates, in accordance with pixel information of an adjacent pixel region, a target pixel region in which no positional information is outputted, the adjacent pixel region being adjacent to a periphery of the target pixel region; and the color discriminating section compares detected coordinates of the first image data and the second image data, respectively, which have been subjected to the interpolation.

According to the arrangement, for each of the first image data constituted only by the first positional information image and the second image data constituted only by the second positional information image, the color discriminating section interpolates, in accordance with pixel information of an adjacent pixel region, a target pixel region in which no positional information is outputted, the adjacent pixel region being adjacent to a periphery of the target pixel region, and the color discriminating section compares detected coordinates of the first image data and the second image data, respectively, which have been subjected to the interpolation. This allows a more accurate comparison between the first positional information image obtained from the at least one first sensor and the second positional information image obtained from the at least one second sensor. Therefore, for example, a color tone of an optical pen which enters a detection target surface can be discriminated more accurately.

Note that a method for interpolating a target pixel region in accordance with pixel information of an adjacent pixel region which is adjacent to a periphery of the target pixel region is exemplified by a method for interpolating a target pixel region assuming that an average of pieces of pixel information which are obtained in a plurality of adjacent pixel regions is pixel information.

The area sensor of the present invention is preferably arranged such that: the at least one first sensor and the at least one second sensor are provided vertically and horizontally in a matrix pattern; and the at least one first sensor and the at least one second sensor are provided alternately in a checkered pattern.

In a case where the total number of light sensors is constant, the arrangement can minimize a reduction in resolution due to provision of two types of light sensors as compared to an area sensor constituted only by light sensors of one type.

A liquid-crystal display device of the present invention includes a liquid-crystal panel which includes an area sensor mentioned above.

According to the arrangement, it is possible to make an area sensor-equipped liquid-crystal display device which is capable of simultaneously carrying out, at a smaller sensor density, (i) detection of color information (recognition of a color) of visible light that enters a detection target surface and (ii) detection of an input position of the visible light.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

According to an area sensor and an area sensor-equipped liquid-crystal display device of the present invention, in a case where two types of sensors are used, it is possible to simultaneously detect color information and an input position of visible light having entered a detection target surface. The present invention is applicable to a mobile phone and a display device (e.g., a PC) each of which includes a display screen that has a touch panel function.

REFERENCE SIGNS LIST

10 Backlight
20 Liquid-crystal Panel (Position Detecting Section)
21 Active Matrix Substrate
22 Counter Substrate
23 Liquid-crystal Layer
25 Optical Filter
25B Blue Color Filter
25R Red Color Filter
25Y Yellow Color Filter
25C Cyan Color Filter
26 Optical Filter Structure
30 Light Sensor Element
30a Light Sensor Element (of Yellow Sensor)
30b Light Sensor Element (of Cyan Sensor)
31 Yellow Sensor (First Sensor)
31C Cyan Sensor (Second Sensor)
40a Front Side Polarizing Plate
40b Back Side Polarizing Plate
50 Checkered Image
50Y Image Data (in accordance with Yellow Sensor)
50C Image Data (in accordance with Cyan Sensor)
70 Area Sensor Control Section
70a Area Sensor Control Section
74 Coordinate Extracting Circuit (Color Discriminating Section)
74a Coordinate Extracting Circuit (A)
74b Coordinate Extracting Circuit (B)
100 Touch Panel Integrated Liquid-crystal Display Device
100a Panel Surface (Detection Target Surface)
120 Liquid-crystal Panel
200 Touch Panel Integrated Liquid-crystal Display Device
200a Panel Surface (Detection Target Surface)

The invention claimed is:

1. An area sensor which detects color information and an input position of visible light by sensing an input image of the visible light on a detection target surface,
said area sensor comprising:
at least one first sensor which includes a first light sensor element configured to sense an intensity of light of a first combination of two primary colors from among red, blue, and green;
at least one second sensor which includes a second light sensor element configured to sense an intensity of light of a second combination of two primary colors from among red, blue, and green, the two primary colors being different from the two primary colors constituting the first combination;
a position detecting section configured to detect color information and an input position of visible light by causing the at least one first sensor and the at least one second sensor to sense respective input images of the visible light on a detection target surface; and
three color filters which are a red color filter, a blue color filter, and a green color filter, wherein
the first light sensor element includes an optical filter which blocks visible light and includes a color filter from among the three color filters, and the color filter transmits light of a first primary color which is other than the two primary colors constituting the first combination, and
the second light sensor element includes an optical filter which blocks visible light and includes a color filter from among the three color filters, and the color filter transmits light of a second primary color which is other than the two primary colors constituting the second combination.

2. The area sensor as set forth in claim 1, wherein the optical filter has a structure in which the red color filter and the blue color filter are stacked.

3. The area sensor as set forth in claim 1, wherein the optical filter is formed by mixing a red pigment, a green pigment, and a blue pigment.

4. A liquid-crystal display device comprising a liquid-crystal panel which includes an area sensor as set forth in claim 1.

5. An area sensor which detects color information and an input position of visible light by sensing an input image of the visible light on a detection target surface,
said area sensor comprising:
at least one first sensor which includes a first light sensor element configured to sense an intensity of light of a first combination of two primary colors from among red, blue, and green;
at least one second sensor which includes a second light sensor element configured to sense an intensity of light of a second combination of two primary colors from among red, blue, and green, the two primary colors being different from the two primary colors constituting the first combination;
a position detecting section which detects color information and an input position of visible light by causing the at least one first sensor and the at least one second sensor to sense respective input images of the visible light on a detection target surface; and
a color discriminating section configured to compare (i) a first positional information image obtained from the at least one first sensor and (ii) a second positional information image obtained from the at least one second sensor and discriminates, in accordance with a result of the comparison, color information of visible light which enters a detection target surface.

6. The area sensor as set forth in claim 5, wherein:
the color discriminating section separates, into (i) first image data constituted only by the first positional information image and (ii) second image data constituted only by the second positional information image, a positional information image which is obtained from the position detecting section;
for each of the first image data and the second image data, the color discriminating section interpolates, in accordance with pixel information of an adjacent pixel region, a target pixel region in which no positional information is outputted, the adjacent pixel region being adjacent to a periphery of the target pixel region; and
the color discriminating section compares detected coordinates of the first image data and the second image data, respectively, which have been subjected to the interpolation.

7. A liquid-crystal display device comprising a liquid-crystal panel which includes an area sensor as set forth in claim 5.

8. An area sensor which detects color information and an input position of visible light by sensing an input image of the visible light on a detection target surface, said area sensor comprising:

at least one first sensor which includes a first light sensor element configured to sense an intensity of light of a first combination of two primary colors from among red, blue, and green;

at least one second sensor which includes a second light sensor element configured to sense an intensity of light of a second combination of two primary colors from among red, blue, and green, the two primary colors being different from the two primary colors constituting the first combination; and a position detecting section which detects color information and an input position of visible light by causing the at least one first sensor and the at least one second sensor to sense respective input images of the visible light on a detection target surface, wherein the at least one first sensor and the at least one second sensor are provided vertically and horizontally in a matrix pattern; and the at least one first sensor and the at least one second sensor are provided alternately in a checkered pattern.

9. A liquid-crystal display device comprising a liquid-crystal panel which includes an area sensor as set forth in claim 8.

* * * * *